United States Patent
Bromand et al.

(10) Patent No.: US 11,681,493 B2
(45) Date of Patent: *Jun. 20, 2023

(54) MEDIA PLAYBACK ACTIONS BASED ON KNOB ROTATION

(71) Applicant: Spotify AB, Stockholm (SE)

(72) Inventors: Daniel Bromand, Stockholm (SE); Richard Mitic, Stockholm (SE); Johan Oskarsson, Stockholm (SE)

(73) Assignee: Spotify AB, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/377,644

(22) Filed: Jul. 16, 2021

(65) Prior Publication Data

US 2022/0043625 A1    Feb. 10, 2022

Related U.S. Application Data

(63) Continuation of application No. 16/396,497, filed on Apr. 26, 2019, now Pat. No. 11,099,806.

(30) Foreign Application Priority Data

Apr. 27, 2018    (EP) .................................... 18169785

(51) Int. Cl.
  *G06F 3/048*    (2013.01)
  *G06F 3/16*    (2006.01)
  *G06F 3/0362*    (2013.01)

(52) U.S. Cl.
  CPC ............ *G06F 3/165* (2013.01); *G06F 3/0362* (2013.01)

(58) Field of Classification Search
  CPC .............................. G06F 3/165; G06F 3/0362
  See application file for complete search history.

(56) References Cited

U.S. PATENT DOCUMENTS

| | | | |
|---|---|---|---|
| 6,820,238 B1 * | 11/2004 | Auflick | G11B 19/022 |
| 7,425,675 B2 | 9/2008 | Chu | |
| 7,735,012 B2 | 6/2010 | Naik | |
| 8,655,303 B2 | 2/2014 | Krampf et al. | |
| 9,355,174 B2 | 5/2016 | Moss et al. | |

(Continued)

FOREIGN PATENT DOCUMENTS

WO    2016/158655    10/2016

OTHER PUBLICATIONS

European Communication Pursuant to Article 94(3) EPC from European Application No. 18169785.5, dated Feb. 14, 2020, 5 pages.

(Continued)

*Primary Examiner* — Rashawn N Tillery
(74) *Attorney, Agent, or Firm* — Merchant & Gould P.C.

(57)    ABSTRACT

A system is provided for streaming media content in a vehicle. The system includes a personal media streaming appliance system configured to connect to a media delivery system and receive media content from the media delivery system at least via a cellular network. The personal media streaming appliance system operates to transmit a media signal representative to the received media content to a vehicle media playback system so that the vehicle media playback system operates to play the media content in the vehicle. Various types of rotations of a knob part of the personal media streaming applicant system result in different media playback actions.

14 Claims, 13 Drawing Sheets

(56) References Cited

U.S. PATENT DOCUMENTS

| | | |
|---|---|---|
| 11,086,936 B2 | 8/2021 | Lamere |
| 11,099,806 B2 | 8/2021 | Bromand |
| 2005/0037814 A1* | 2/2005 | Yasui .................... G06F 3/0485 |
| | | 455/566 |
| 2006/0010167 A1 | 1/2006 | Grace et al. |
| 2007/0015457 A1 | 1/2007 | Krampf et al. |
| 2007/0063995 A1* | 3/2007 | Bailey ................ H04N 21/4622 |
| | | 345/184 |
| 2007/0065098 A1* | 3/2007 | Abe ....................... H04N 5/772 |
| | | 386/E5.072 |
| 2007/0266344 A1 | 11/2007 | Olcott et al. |
| 2007/0280489 A1* | 12/2007 | Roman .................. H04H 60/04 |
| | | 381/119 |
| 2007/0296711 A1 | 12/2007 | Yee |
| 2007/0300180 A1 | 12/2007 | Hama |
| 2009/0049407 A1 | 2/2009 | Casto |
| 2009/0109069 A1* | 4/2009 | Takasaki ................. G06F 3/018 |
| | | 341/35 |
| 2010/0039374 A1 | 2/2010 | Li |
| 2010/0094444 A1 | 4/2010 | Utsuki |
| 2010/0114968 A1* | 5/2010 | Dean ..................... G06Q 30/02 |
| | | 707/E17.032 |
| 2011/0265003 A1 | 10/2011 | Schubert |
| 2012/0072864 A1 | 3/2012 | Hauschild |
| 2012/0089910 A1* | 4/2012 | Cassidy ............... H04N 21/472 |
| | | 715/716 |
| 2014/0298261 A1 | 10/2014 | Imoto |
| 2015/0121274 A1* | 4/2015 | Kishimoto .......... G06F 3/04883 |
| | | 715/771 |
| 2016/0034051 A1* | 2/2016 | Xi ......................... G06F 3/0485 |
| | | 345/156 |
| 2016/0062567 A1 | 3/2016 | Yang |
| 2016/0124591 A1* | 5/2016 | Hisatsugu ............. G06F 3/0485 |
| | | 715/830 |
| 2016/0259422 A1 | 9/2016 | Funase |
| 2017/0366835 A1 | 12/2017 | Chakra et al. |
| 2018/0253148 A1 | 9/2018 | Santamaria |
| 2019/0332361 A1* | 10/2019 | Batra ...................... G06F 3/165 |
| 2020/0064995 A1* | 2/2020 | Gorsica .................. G06F 3/017 |
| 2021/0051355 A1* | 2/2021 | Li .................... H04N 21/25825 |

OTHER PUBLICATIONS

European Extended Search Report from European Application. No. 18169785.5, dated Oct. 26, 2018, 6 pages.

European Search Report from European Application. No. 20200190.5, dated Jan. 25, 2021, 10 pages.

\* cited by examiner

MEDIA PLAYBACK ACTIONS BASED ON KNOB ROTATION

CROSS-REFERENCE TO RELATED APPLICATION(S)

This application is a continuation of U.S. application Ser. No. 16/396,497, filed 26 Apr. 2019, which claims the benefit of Application No. 18169785.5, filed 27 Apr. 2018 in Europe, and which applications are hereby incorporated by reference. To the extent appropriate, a claim of priority is made to the above disclosed applications.

BACKGROUND

Many people enjoy consuming media content while traveling or during other activities. For example, many drivers and passengers listen to audio content, such as songs, albums, podcasts, audiobooks, and other types of audible content. Typical sources of such audio content in vehicles include radios and fixed media players, such as devices that can play media content from CDs, USB drives, or SD cards. Alternatively, mobile devices, such as mobile phones or tablets running audio streaming applications, can offer a personalized and flexible music-consuming experience using large catalogs of media content available from a media content server.

SUMMARY

In general terms, the present disclosure relates to queuing media content for playback. In one possible configuration and by non-limiting example, media content playback actions can be initiated via a rotatable input device. Various aspects are described in this disclosure, which include, but are not limited to, the following aspects.

One aspect is a method for queuing media content for playback. The example method includes queuing a media context of a first type, where the media context includes media tracks. The method also includes receiving rotational input, analyzing the rotational input to determine a first characteristic, which includes determining an amount of rotation in the rotational input. The method also includes determining a playback action based on the amount of rotation in the rotational input. Playback action is selected from a group including advancing a next track of the media context to a top of the media queue and queuing a different media context of the first type.

Another aspect is a media content playback system. The media content playback system includes one or more processing devices and a memory device. The memory device is coupled to the one or more processing devices and comprises instructions thereon that, when executed by the one or more processing devices, cause the one or more processing devices to: queue a media context of a first type, the media context including media tracks; receive rotational input; analyze the rotational input to determine a first characteristic, including determining an amount of rotation in the rotational input; and, based on the amount of rotation in the rotational input, determine a playback action, the playback action being selected from a group including: advance a next track of the media context to a top of the media queue and queue a different media context of the first type.

DETAILED DESCRIPTION

Figure 1:
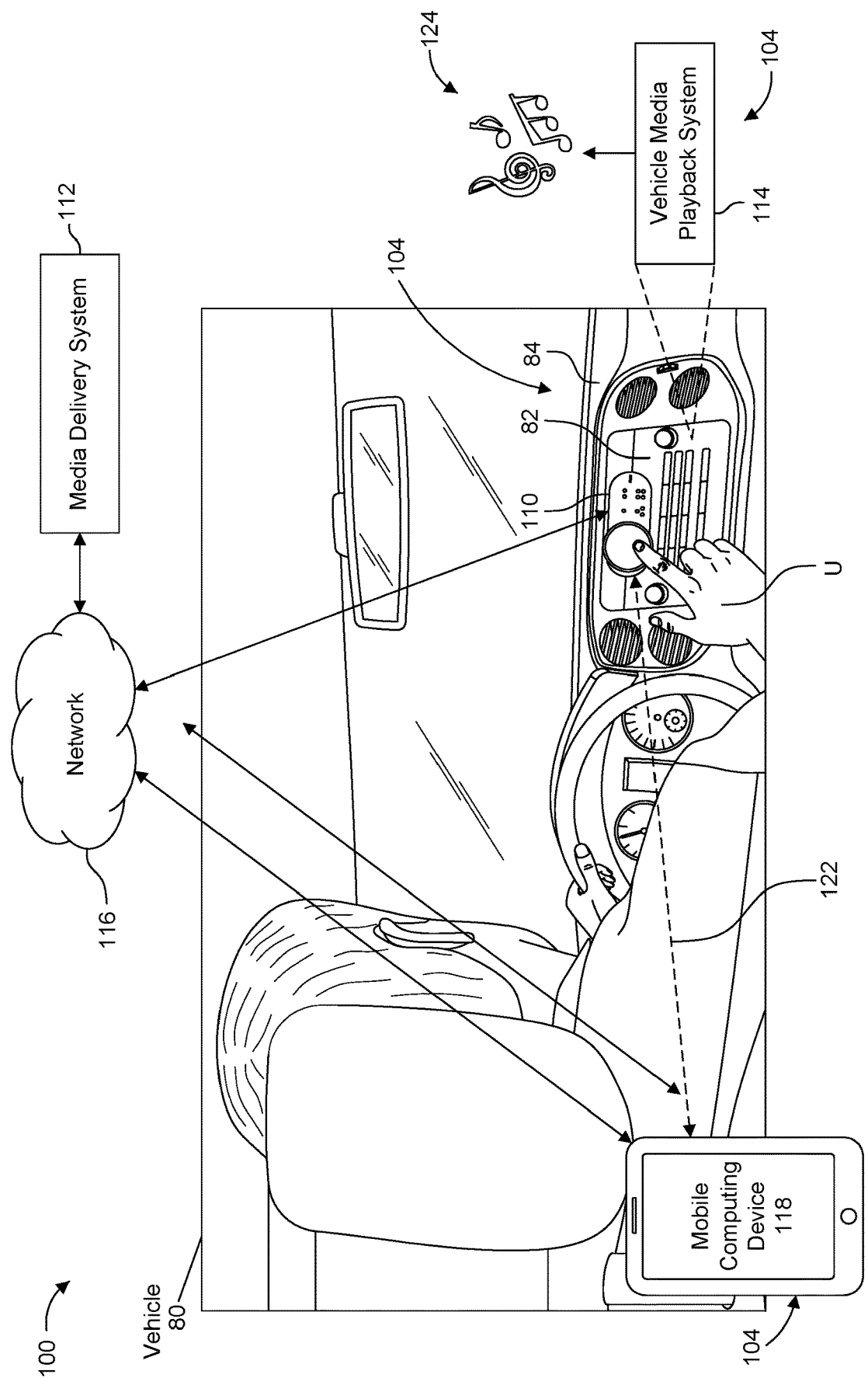
FIG. 1 illustrates an example system for streaming media content for playback.

Various embodiments will be described in detail with reference to the drawings, wherein like reference numerals represent like parts and assemblies throughout the several views.

People spend a significant amount of time traveling in vehicles. Many of them find that time to be more enjoyable when they are listening to music, watching videos, or otherwise consuming media content. Media content includes audio and video content. Examples of audio content include songs, albums, playlists, radio stations, podcasts, audiobooks, and other audible media content items. Examples of video content include movies, music videos, television programs, and other visible media content items. In many cases, video content also includes audio content. As used herein, the term "vehicle" can be any machine that is operable to transport people or cargo. Vehicles can be motorized or non-motorized. Vehicles can be for public or private transport. Examples of vehicles include motor vehicles (e.g., cars, trucks, buses, motorcycles), rail vehicles (e.g., trains, trams), tracked vehicles, watercraft (e.g., ships, boats), aircraft, human-powered vehicles (e.g., bicycles), wagons, and other transportation means. A user can drive a vehicle or ride in as a passenger for traveling. As used herein, the term "travel" and variants thereof refers to any activity in which a user is in transit between two locations.

Consuming media content in a vehicle presents many challenges. In general, a user in a moving vehicle may have limited attention available for interacting with a media playback device due to the need to concentrate on travel related activities, such as driving and navigation. Therefore, while a vehicle is moving, it can be difficult for a user in the vehicle to interact with a media playback device without disrupting the driving or navigation. Further, the user interface of a media playback device can be overly complex, or may require such fine motor skills that it can be difficult to use while traveling in a vehicle. Voice-based user interfaces also encounter significant challenges to use in a vehicle environment. The passenger areas of a vehicle are often noisy due to engine noise, road noise, wind and weather noises, passenger noises, and the sound of any media content that may be playing on a media playback system in the vehicle. This noise hampers the ability of the voice-based user interface to interact with a user. Moreover, accessing media content while traveling may be difficult, expensive, or impossible depending on network availability or capacity along the route of travel. Further, accessing and playing media content can require significant amounts of electric power. Thus, use of a mobile device for media content playback during travel may be undesirable because it will drain the battery. It can also be challenging to connect a media playback device to a vehicle's built-in audio system because of the requirement to connect to auxiliary cables or undergo a complicated wireless pairing process. Embodiments disclosed herein address some or all of these challenges. It should be understood, however, that various aspects described herein are not limited to use of a media playback device during travel.

On the other hand, many users desire a personalized media consuming experience. For example, a user can access almost limitless catalogs of media content through various free or fee-based media delivery services, such as media streaming services. Users can use mobile devices or other media playback devices to access large catalogs of media content. Due to such large collections of media content, it is desired to make it possible to customize a selection of media content to match users' individual tastes and preferences so that users can consume their favorite media content while traveling in a vehicle.

Many vehicles include a built-in media playback device, such as a radio or a fixed media player, such as a player that can play media content from a CD, USB driver, or SD cards. However, the media content that is delivered using these built in vehicle media playback devices is greatly limited and is not flexible or customizable to the user.

Alternatively, a mobile device, such as a smartphone or a tablet, can be used by a user to enjoy personalized and flexible music consuming experience in a vehicle by running music streaming applications thereon. However, mobile devices are not well suited for use in a vehicle environment for various reasons. For example, mobile devices are not readily accessible or controllable while driving or navigating. Further, connection between a mobile device and a vehicle audio system is often inconvenient and unreliable. Moreover, the music streaming application is not automatically ready to run and play media content, and the user needs to pick up the mobile device and open the music streaming application and control a sophisticated user interface to play media content. Additionally, many users have limited mobile data available via their mobile devices and are concerned about data usage while using the music streaming application in the vehicle. Battery drainage and legal restrictions on use while driving are further drawbacks to using mobile devices for playing media content in the vehicle.

To address these challenges, the present disclosure provides a special-purpose personal appliance that can be used for streaming media in a vehicle. The appliance is also referred to herein as the personal media streaming appliance (PMSA), the smart vehicle media appliance (SVMA), the personal vehicle media streaming appliance (PVMSA), or the like. In some embodiments, the appliance is specially designed to be dedicated for media streaming purposes in a vehicle, and there is no other general use. Some embodiments of the appliance can operate to communicate directly with a media content server and receive streamed media content from the server via a cellular network. In these embodiments, other computing devices, such mobile devices, are not involved in this direct communication between the appliance and the media content server. Mobile data cost can be included in the subscription of the media streaming service or a purchase price of the personal appliance. Therefore, the customer's possible concern about mobile data usage can be eliminated. In other embodiments, the appliance can connect to another computing device, such as a mobile device, that provides a mobile hotspot to enable the appliance to communicate with the media content server rather than the appliance communicating with it directly. For example, a mobile device is used to assist in communication between the appliance and the media content server.

Further, the appliance can be associated with a user account of the user for the media streaming service so that the user can enjoy personalized media content.

In some embodiments, the appliance provides a simplified user interface so that a user can easily control playback of media content in a vehicle while maintaining his or her focus on other tasks such as driving or navigating. For example, the appliance has a limited set of physical control elements that are intuitively controllable for playback of media content with little (often only one) input from a user. Examples of such physical control elements include a rotatable knob and one or more physically-depressible buttons.

Further, in some embodiments, the appliance is configured to be easily mounted to an interior structure of a vehicle, such as a dashboard, so that the user can easily reach the appliance.

In some embodiments, the appliance also provides an output interface that can be easily connected to a vehicle audio system, such as via an auxiliary input port or Bluetooth. Therefore, the media content streamed to the appliance can then be transmitted from the appliance to the vehicle audio system for playback in the vehicle.

In some embodiments, the appliance can includes a voice interaction system designed for voice interaction with a user in the noisy environment of a vehicle. In some embodiments, the appliance includes multiple microphones that reduce the effects of ambient noise in the passenger area of the vehicle. In an example, the appliance includes at least three microphones: two directed to the passenger area of the vehicle and another facing away from the passenger area of the vehicle to pick up vibrations and low frequency noise for cancellation. The appliance also applies spectral noise cancellation to reduce non-voice frequencies. In addition, omnidirectional noise cancellation is applied in some embodiments to reduce omni-directional sound (e.g., vehicle noise). Directional noise is detected by determining a difference between audio input detected by the two microphones facing the passenger area. The difference is preserved as directional audio input. The appliance further cancels out audio that it is currently playing, allowing the appliance to detect voice commands even over loud music, for instance. In this manner, the appliance is arranged to provide an improved voice-based interface in a vehicle environment.

Further, the present disclosure generally relates to receiving and analyzing knob rotations. The present disclosure additionally relates to performing one or more media playback actions based on the knob rotations.

As described herein, consuming media content may include one or more of listening to audio content, watching video content, or consuming other types of media content. For ease of explanation, the embodiments described in this application are presented using specific examples. For example, audio content (and in particular music) is described as an example of one form of media consumption. As another example, a vehicle is described as an example of an environment in which media content is consumed. Further, traveling (and in particular driving) in a vehicle is described as an example of an activity during which media content is consumed. However, it should be understood that the same concepts are similarly applicable to other forms of media consumption and to other environments or activities, and at least some embodiments include other forms of media consumption and/or are configured for use in other environments or during other activities.

FIG. 1 illustrates an example system 100 for streaming media content for playback. The system 100 can be used in a vehicle 80. The vehicle 80 includes a dashboard 82 or a head unit 84. The system 100 includes one or more media playback devices 104 configured to play media content, such as a personal media streaming appliance (PMSA) system 110, a media delivery system 112, a vehicle media playback system 114, and a mobile computing device 118. The system 100 further includes a data communication network 116 and an in-vehicle wireless data communication network 122.

The PMSA system 110 operates to receive media content that is provided (e.g., streamed, transmitted, etc.) by a system external to the PMSA system 110, such as the media delivery system 112, and transmit the media content to the vehicle media playback system 114 for playback. In some embodiments, the PMSA system 110 is a portable device which can be carried into and used in the vehicle 80. The PMSA system 110 can be mounted to a structure of the vehicle 80, such as the dashboard 82 or the head unit 84. In other embodiments, the PMSA system 110 can be configured to be built in a structure of the vehicle 80. An example of the PMSA system 110 is illustrated and described in more detail with reference to FIGS. 2 and 6.

The media delivery system 112 operates to provide media content to one or more media playback devices 104 via the network 116. In the illustrated example, the media delivery system 112 provides media content to the PMSA system 110 for playback of media content using the vehicle media playback system 114. An example of the media delivery system 112 is illustrated and described in further detail herein, such as with reference to FIG. 3.

The vehicle media playback system 114 operates to receive media content from the PMSA system 110 and generates a media output 124 to play the media content in the vehicle 80. An example of the vehicle media playback system 114 is illustrated and described in further detail herein, such as with reference to FIG. 4.

The network 116 is a data communication network that facilitates data communication between the PMSA system 110 and the media delivery system 112. In some embodiments, the mobile computing device 118 can also communicate with the media delivery system 112 across the network 116. The network 116 typically includes a set of computing devices and communication links between the computing devices. The computing devices in the network 116 use the links to enable communication among the computing devices in the network. The network 116 can include one or more routers, switches, mobile access points, bridges, hubs, intrusion detection devices, storage devices, standalone server devices, blade server devices, sensors, desktop computers, firewall devices, laptop computers, handheld computers, mobile telephones, vehicular computing devices, and other types of computing devices.

In various embodiments, the network 116 includes various types of communication links. For example, the network 116 can include wired and/or wireless links, including cellular, Bluetooth, ultra-wideband (UWB), 802.11, ZigBee, and other types of wireless links. Furthermore, in various embodiments, the network 82 is implemented at various scales. For example, the network 116 can be implemented as one or more vehicle area networks, local area networks (LANs), metropolitan area networks, subnets, wide area networks (WAN) (such as the Internet), or can be implemented at another scale. Further, in some embodiments, the network 116 includes multiple networks, which may be of the same type or of multiple different types.

In some embodiments, the network 116 can also be used for data communication between other media playback devices 104 (e.g., the mobile computing device 118) and the media delivery system 112. Because the network 116 is configured primarily for data communication between computing devices in the vehicle 80 and computing devices outside the vehicle 80, the network 116 is also referred to herein as an out-of-vehicle network for out-of-vehicle data communication.

Unlike the network 116, the in-vehicle wireless data communication 122 can be used for direct data communication between computing devices (e.g., the media playback devices 104) in the vehicle 80. In some embodiments, the in-vehicle wireless data communication 122 is used for direct communication between the PMSA system 110 and the mobile computing device 118. In other embodiments, the mobile computing device 118 can communicate with the PMSA system 110 in the data communication network 116. In some embodiments, the in-vehicle wireless data communication 122 can also be used for data communication between the PMSA system 110 and the vehicle media playback system 114.

Various types of wireless communication interfaces can be used for the in-vehicle wireless data communication 122. In some embodiments, the in-vehicle wireless data communication 122 includes Bluetooth® technology. In other embodiments, the in-vehicle wireless data communication 122 includes WiFi® technology. In yet other embodiments, other suitable wireless communication interfaces can be used for the in-vehicle wireless data communication 122, such as near field communication (NFC) and an ultrasonic data transmission.

In some embodiments, the mobile computing device 118 is configured to play media content independently from the PMSA system 110. In some embodiments, the mobile computing device 118 is a standalone computing device that, without the PMSA system 110 involved, can communicate with the media delivery system 112 and receive media content from the media delivery system 112 for playback in the vehicle 80. An example of the mobile computing device 118 is illustrated and described in further detail herein, such as with reference to FIG. 5.

Figure 2:
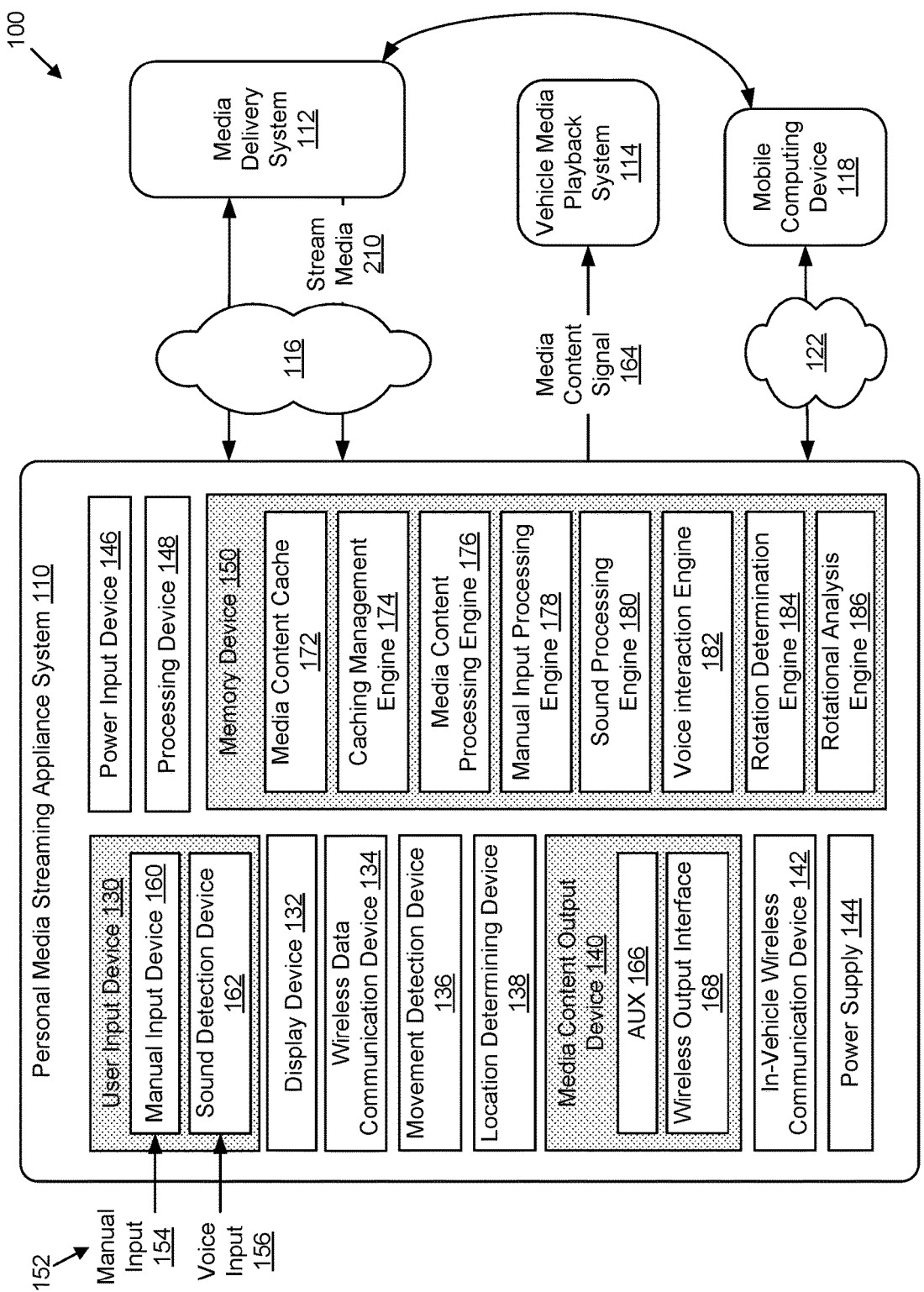
FIG. 2 is a block diagram of an example embodiment of a personal media streaming appliance (PMSA) system.

FIG. 2 is a block diagram of an example embodiment of the PMSA system 110 of the media streaming system 100 shown in FIG. 1. In this example, the PMSA system 110 includes a user input device 130, a display device 132, a wireless data communication device 134, a movement detection device 136, a location determining device 138, a media content output device 140, an in-vehicle wireless communication device 142, a power supply 144, a power input device 146, a processing device 148, and a memory device 150.

In some embodiments, the PMSA system 110 is a system dedicated for streaming personalized media content in a vehicle environment. At least some embodiments of the PMSA system 110 have limited functionalities specifically selected for streaming media content from the media delivery system 112 at least via the network 116 and/or for providing other services associated with the media content streaming service. The PMSA system 110 may have no other general use such as found in other computing devices, such as smartphones, tablets, and other smart devices. For example, in some embodiments, when the PMSA system 110 is powered up, the PMSA system 110 is configured to automatically activate a software application that is configured to perform the media content streaming and media playback operations of the PMSA system 110 using at least one of the components, devices, and elements of the PMSA system 110. In some embodiments, the software application of the PMSA system 110 is configured to continue running until the PMSA system 110 is powered off or powered down to a predetermined level. In some embodiments, the PMSA system 110 is configured to be free of any user interface control that would allow a user to disable the automatic activation of the software application on the PMSA system 110.

As described herein, the PMSA system 110 provides various structures, features, and functions that improve the user experience of consuming media content in a vehicle.

As illustrated, the PMSA system 110 can communicate with the media delivery system 112 to receive media content via the network 116 and enable the vehicle media playback system 114 to play the media content in the vehicle. In some embodiments, the PMSA system 110 can communicate with the mobile computing device 118 that is in data communication with the media delivery system 112. As described herein, the mobile computing device 118 can communicate with the media delivery system 112 via the network 116.

The user input device 130 operates to receive a user input 152 from a user U for controlling the PMSA system 110. As illustrated, the user input 152 can include a manual input 154 and a voice input 156. In some embodiments, the user input device 130 includes a manual input device 160 and a sound detection device 162.

The manual input device 160 operates to receive the manual input 154 for controlling playback of media content via the PMSA system 110. In addition, in some embodiments, the manual input 154 is received for managing various pieces of information transmitted via the PMSA system 110 and/or controlling other functions or aspects associated with the PMSA system 110.

In some embodiments, the manual input device 160 includes one or more manual control elements configured to receive various manual control actions, such as pressing actions and rotational actions. As described herein, the physical input device 160 includes a manual control knob 510 and one or more physical buttons 512, which is further illustrated and described with reference to FIG. 6.

The sound detection device 162 operates to detect and record sounds from proximate the PMSA system 110. For example, the sound detection device 162 can detect sounds including the voice input 156. In some embodiments, the sound detection device 162 includes one or more acoustic sensors configured to detect sounds proximate the PMSA system 110. For example, acoustic sensors of the sound detection device 162 includes one or more microphones.

Various types of microphones can be used for the sound detection device 162 of the PMSA system 110.

In some embodiments, the voice input 156 is a user's voice (also referred to herein as an utterance) for controlling playback of media content via the PMSA system 110. In addition, the voice input 156 is a user's voice for managing various data transmitted via the PMSA system 110 and/or controlling other functions or aspects associated with the PMSA system 110.

In some embodiments, the sound detection device 162 is configured to cancel noises from the received sounds so that a desired sound (e.g., the voice input 156) is clearly identified. For example, the sound detection device 162 can include one or more noise-canceling microphones which are configured to filter ambient noise from the voice input 156. In addition or alternatively, a plurality of microphones of the sound detection device 162 are arranged at different locations in a body of the PMSA system 110 and/or oriented in different directions with respect to the body of the PMSA system 110, so that ambient noise is effectively canceled from the voice input 156 or other desired sounds being identified.

In some embodiments, the sounds detected by the sound detection device 162 can be processed by the sound processing engine 180 of the PMSA system 110 as described below.

Referring still to FIG. 2, the display device 132 operates to display information to the user U. Examples of such information include media content playback information, notifications, and other information.

In some embodiments, the display device 132 operates as a display screen only and is not capable of receiving a user input. By receiving the manual input 154 only via the manual input device 160 and disabling receipt of manual input via the display device 132, the user interface of the PMSA system 110 is simplified so that the user U can control the PMSA system 110 while maintaining focus on other activities in the vehicle 80. It is understood however that, in other embodiments, the display device 132 is configured as a touch-sensitive display screen that operates as both a display screen and a user input device. In yet other embodiments, the PMSA system 110 does not include a display device.

As described herein, in some embodiments, the display device 132 is arranged at the manual input device 160. In other embodiments, the display device 132 is arranged separate from the manual input device 160.

The wireless data communication device 134 operates to enable the PMSA system 110 to communicate with one or more computing devices at a remote location that is outside the vehicle 80. In the illustrated example, the wireless data communication device 134 operates to connect the PMSA system 110 to one or more networks outside the vehicle 80, such as the network 116. For example, the wireless data communication device 134 is configured to communicate with the media delivery system 112 and receive media content from the media delivery system 112 at least partially via the network 116. The wireless data communication device 134 can be a wireless network interface of various types which connects the PMSA system 110 to the network 116. Examples of the wireless data communication device 134 include wireless wide area network (WWAN) interfaces, which use mobile telecommunication cellular network technologies. Examples of cellular network technologies include LTE, WiMAX, UMTS, CDMA2000, GSM, cellular digital packet data (CDPD), and Mobitex. In the some embodiments, the wireless data communication device 134 is configured as a cellular network interface to facilitate data communication between the PMSA system 110 and the media delivery system 112 over cellular network.

The movement detection device 136 can be used to detect movement of the PMSA system 110 and the vehicle 80. In some embodiments, the movement detection device 136 is configured to monitor one or more factors that are used to determine movement of the vehicle 80. The movement detection device 136 can include one or more sensors that are configured to detect movement, position, and/or orientation of the PMSA system 110. As an example, the movement detection device 136 is operable to determine an orientation of the PMSA system 110. The movement detection device 136 can detect changes in the determined orientation and interpret those changes as indicating movement of the PMSA system 110. In some embodiments, the movement detection device 136 includes an accelerometer. In other embodiments, the movement detection device 136 includes a gyroscope. Other sensors can also be used for the movement detection device 136, such as a magnetometer, a GPS receiver, an altimeter, an odometer, a speedometer, a shock detector, a vibration sensor, a proximity sensor, and an optical sensor (e.g., a light sensor, a camera, and an infrared sensor).

The location determining device 138 is a device that determines the location of the PMSA system 110. In some embodiments, the location determining device 138 uses one or more of Global Positioning System (GPS) technology (which may receive GPS signals), Global Navigation Satellite System (GLONASS), cellular triangulation technology, network-based location identification technology, Wi-Fi positioning systems technology, and combinations thereof.

The media content output device 140 is an interface that enables the PMSA system 110 to transmit media content to the vehicle media playback device 114. Some embodiments of the PMSA system 110 do not have a speaker and thus cannot play media content independently. In these embodiments, the PMSA system 110 is not regarded as a standalone device for playing media content. Instead, the PMSA system 110 transmits media content to another media playback device, such as the vehicle media playback device 114 to enable the other media playback device to play the media content, such as through the vehicle stereo system.

As illustrated, the PMSA system 110 (e.g., a media content processing engine 176 thereof in FIG. 2) can convert media content to a media content signal 164, the media content output device 140 transmits the media content signal 164 to the vehicle media playback system 114. The vehicle media playback system 114 can play the media content based on the media content signal 164. For example, the vehicle media playback system 114 operates to convert the media content signal 164 into a format that is readable by the vehicle media playback system 114 for playback.

In some embodiments, the media content output device 140 includes an auxiliary (AUX) output interface 166 and a wireless output interface 168.

Figure 6:
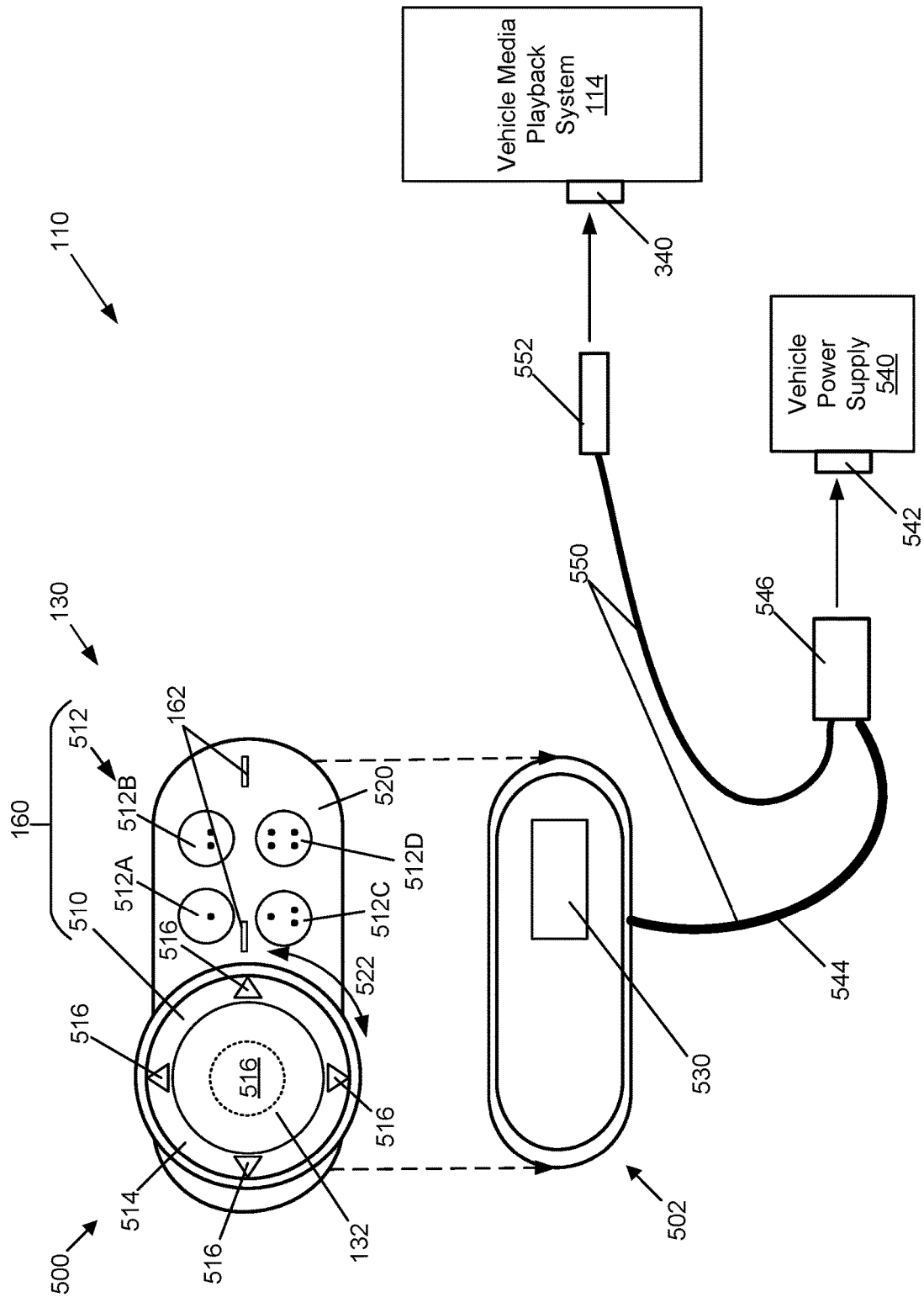
FIG. 6 schematically illustrates an example embodiment of the PMSA system.

The AUX output interface 166 is configured to connect the PMSA system 110 to the vehicle media playback system 114 via a cable (e.g., a media content output line 550 in FIG. 6) of the PMSA system 110. In some embodiments, as illustrated in FIG. 6, the media content output line 550 extending from the PMSA system 110 is connected to an input connector 340 (e.g., an auxiliary input jack or port) of the vehicle media playback system 114. As illustrated herein, the media content output line 550 can be of various types, such as an analog audio cable or a USB cable.

The wireless output interface 168 is configured to connect the PMSA system 110 to the vehicle media playback system 114 via a wireless communication protocol. In some embodiments, the wireless output interface 168 is configured for Bluetooth connection. In other embodiments, the wireless output interface 168 is configured for other types of wireless connection. In some embodiments, the wireless output interface 168 is incorporated into, or implemented with, the in-vehicle wireless communication device 142. For example, when the media content output device 140 wirelessly transmits media content to the vehicle media playback system 114, the in-vehicle wireless communication device 142 can be used to implement the wireless output interface 168 of the media content output device 140.

Referring still to FIG. 2, the in-vehicle wireless communication device 142 operates to establish a wireless data communication, such as the in-vehicle wireless data communication 122, between computing devices in a vehicle 80. In the illustrated example, the in-vehicle wireless communication device 142 is used to enable the PMSA system 110 to communicate with other computing devices, such as the mobile computing device 118, in the vehicle 80. Various types of wireless communication interfaces can be used for the in-vehicle wireless communication device 142, such as Bluetooth technology®, WiFi® technology, a near field communication (NFC), and an ultrasound data transmission. The in-vehicle wireless communication is also referred to herein as a short-range wireless communication.

The power supply 144 is included in the example PMSA system 110 and is configured to supply electric power to the PMSA system 110. In some embodiments, the power supply 144 includes at least one battery. The power supply 144 can be rechargeable. For example, the power supply 144 can be recharged using the power input device 146 that is connected to an external power supply. In some embodiments, the power supply 144 is included inside the PMSA system 110 and is not removable from the PMSA system 110. In other embodiments, the power supply 144 is removable by the user from the PMSA system 110.

The power input device 146 is configured to receive electric power to maintain activation of components of the PMSA system 110. As described herein, the power input device 146 is connected to a power source of the vehicle 80 (e.g., a vehicle power supply 540 in FIG. 6) and use the electric power from the vehicle 80 as a primary power source to maintain activation of the PMSA system 110 over an extended period of time, such as longer than several minutes.

The processing device 148, in some embodiments, comprises one or more central processing units (CPU). In other embodiments, the processing device 148 additionally or alternatively includes one or more digital signal processors, field-programmable gate arrays, or other electronic circuits.

The memory device 150 typically includes at least some form of computer-readable media. Computer readable media includes any available media that can be accessed by the PMSA system 110. By way of example, computer-readable media include computer readable storage media and computer readable communication media.

Computer readable storage media includes volatile and nonvolatile, removable and non-removable media implemented in any device configured to store information such as computer readable instructions, data structures, program modules, or other data. Computer readable storage media includes, but is not limited to, random access memory, read only memory, electrically erasable programmable read only memory, flash memory and other memory technology, compact disc read only memory, blue ray discs, digital versatile discs or other optical storage, magnetic storage devices, or any other medium that can be used to store the desired information and that can be accessed by the PMSA system 110. In some embodiments, computer readable storage media is non-transitory computer readable storage media.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The memory device 150 operates to store data and instructions. In some embodiments, the memory device 150 stores instructions for a media content cache 172, a caching management engine 174, a media content processing engine 176, a manual input processing engine 178, a sound processing engine 180, a voice interaction engine 182, a rotation determination engine 184, and a rotational analysis engine 186.

Some embodiments of the memory device 150 include the media content cache 172. The media content cache 172 stores media content items, such as media content items that have been received from the media delivery system 112. The media content items stored in the media content cache 172 may be stored in an encrypted or unencrypted format. In some embodiments, the media content cache 172 also stores metadata about media content items such as title, artist name, album name, length, genre, mood, era, etc. The media content cache 172 can further store playback information about the media content items and/or other information associated with the media content items.

The caching management engine 174 is configured to receive and cache media content in the media content cache 172 and manage the media content stored in the media content cache 172. In some embodiments, when media content is streamed from the media delivery system 112, the caching management engine 174 operates to cache at least a portion of the media content into the media content cache 172 so that at least a portion of the cached media content can be transmitted to the vehicle media playback system 114 for playback. In other embodiments, the caching management engine 174 operates to cache at least a portion of media content into the media content cache 172 while online so that the cached media content is retrieved for playback while the PMSA system 110 is offline.

The media content processing engine 176 is configured to process the media content that is received from the media delivery system 112, and generate the media content signal 164 usable for the vehicle media playback system 114 to play the media content. The media content signal 164 is transmitted to the vehicle media playback system 114 using the media content output device 140, and then decoded so that the vehicle media playback system 114 plays the media content in the vehicle 80.

The manual input processing engine 178 operates to receive the manual input 154 via the manual input device 160. In some embodiments, when the manual input device 160 is actuated (e.g., pressed or rotated) upon receiving the manual input 154, the manual input device 160 generates an electric signal representative of the manual input 154. The manual input processing engine 178 can process the electric signal and determine the user input (e.g., command or instruction) corresponding to the manual input 154 to the PMSA system 110. In some embodiments, the manual input processing engine 178 can perform a function requested by the manual input 154, such as controlling playback of media content. The manual input processing engine 178 can cause one or more other engines to perform the function associated with the manual input 154.

The sound processing engine 180 is configured to receive sound signals obtained from the sound detection device 162 and process the sound signals to identify different sources of the sounds received via the sound detection device 162. In some embodiments, the sound processing engine 180 operates to filter the user's voice input 156 from noises included in the detected sounds. Various noise cancellation technologies, such as active noise control or cancelling technologies or passive noise control or cancelling technologies, can be used for filter the voice input from ambient noise. In examples, the sound processing engine 180 filters out omni-directional noise and preserves directional noise (e.g., an audio input difference between two microphones) in audio input. In examples, the sound processing engine 180 removes frequencies above or below human speaking voice frequencies. In examples, the sound processing engine 180 subtracts audio output of the device from the audio input to filter out the audio content being provided by the device. (e.g., to reduce the need of the user to shout over playing music). In examples, the sound processing engine 180 performs echo cancellation. By using one or more of these techniques, the sound processing engine 180 provides sound processing customized for use in a vehicle environment.

In other embodiments, the sound processing engine 180 operates to process the received sound signals to identify the sources of particular sounds of the sound signals, such as people's conversation in the vehicle, the vehicle engine sound, or other ambient sounds associated with the vehicle.

In some embodiments, a recording of sounds captured using the sound detection device 162 can be analyzed using speech recognition technology to identify words spoken by the user. The words may be recognized as commands from the user that alter the playback of media content and/or other functions or aspect of the PMSA system 110. In some embodiments, the words and/or the recordings may also be analyzed using natural language processing and/or intent recognition technology to determine appropriate actions to take based on the spoken words. Additionally or alternatively, the sound processing engine 180 may determine various sound properties about the sounds proximate the PMSA system 110 such as volume, dominant frequency or frequencies, etc. These sound properties may be used to make inferences about the environment proximate to the PMSA system 110.

Figure 3:
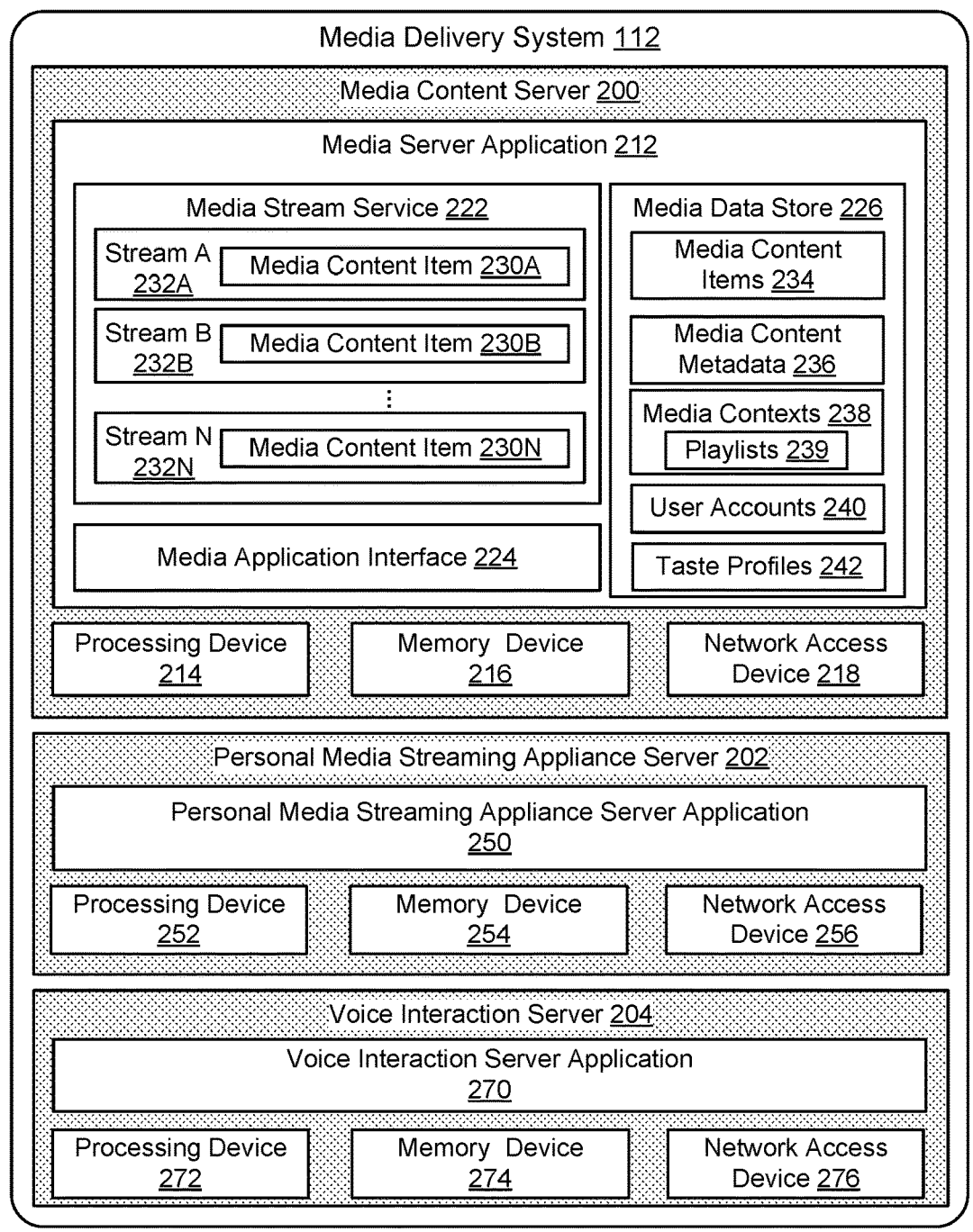
FIG. 3 is a block diagram of an example embodiment of a media delivery system.

The voice interaction engine 182 operates to cooperate with the media delivery system 112 (e.g., a voice interaction server 204 thereof as illustrated in FIG. 3) to identify a command (e.g., a user intent) that is conveyed by the voice input 156. In some embodiments, the voice interaction engine 182 transmits the user's voice input 156 that is detected by the sound processing engine 180 to the media delivery system 112 so that the media delivery system 112 operates to determine a command intended by the voice input 156. In other embodiments, at least some of the determination process of the command can be performed locally by the voice interaction engine 182.

In addition, some embodiments of the voice interaction engine 182 can operate to cooperate with the media delivery system 112 (e.g., the voice interaction server 204 thereof) to provide a voice assistant that performs various voice-based interactions with the user, such as voice feedbacks, voice notifications, voice recommendations, and other voice-related interactions and services.

Generally, rotation determination engine 184 is configured to receive and process data relating to rotation of a knob that is part of the PMSA. Rotation determination engine 184 can track movement of the knob, which can include recording start time of rotation and end time, position of the knob at the start of rotation and at the end of rotation, rotational speed, and the like.

Rotational analysis engine 186 analyzes data from rotation determination engine 184 to determine one or more characteristics of the rotation. Rotational analysis engine 186 can then determine one or more media playback actions based on analysis of the rotational data. Additional functions of rotational analysis engine 186 are described below with reference to FIGS. 7-14.

FIG. 3 is a block diagram of an example embodiment of the media delivery system 112 of FIG. 1. The media delivery system 112 includes a media content server 200, a personal media streaming appliance (PMSA) server 202, and a voice interaction server 204.

The media delivery system 112 comprises one or more computing devices and provides media content to the PMSA system 110 and, in some embodiments, other media playback devices, such as the mobile computing device 118, as well. In addition, the media delivery system 112 interacts with the PMSA system 110 to provide the PMSA system 110 with various functionalities.

In at least some embodiments, the media content server 200, the PMSA server 202, and the voice interaction server 204 are provided by separate computing devices. In other embodiments, the media content server 200, the PMSA server 202, and the voice interaction server 204 are provided by the same computing device(s). Further, in some embodiments, at least one of the media content server 200, the PMSA server 202, and the voice interaction server 204 is provided by multiple computing devices. For example, the media content server 200, the PMSA server 202, and the voice interaction server 204 may be provided by multiple redundant servers located in multiple geographic locations.

Although FIG. 3 shows a single media content server 200, a single PMSA server 202, and a single voice interaction server 204, some embodiments include multiple media servers, multiple PMSA servers, and/or multiple voice interaction servers. In these embodiments, each of the multiple media servers, multiple PMSA serves, and multiple voice interaction servers may be identical or similar to the media content server 200, the PMSA server 202, and the voice interaction server, respectively, as described herein, and may provide similar functionality with, for example, greater capacity and redundancy and/or services from multiple geographic locations. Alternatively, in these embodiments, some of the multiple media servers, the multiple PMSA servers, and/or the multiple voice interaction servers may perform specialized functions to provide specialized services. Various combinations thereof are possible as well.

The media content server 200 transmits stream media 210 (FIG. 2) to media playback devices such as the PMSA system 110. In some embodiments, the media content server 200 includes a media server application 212, a processing device 214, a memory device 216, and a network access device 218. The processing device 214 and the memory device 216 may be similar to the processing device 148 and the memory device 150, respectively, which have each been previously described. Therefore, the description of the processing device 214 and the memory device 216 are omitted for brevity purposes.

The network access device 218 operates to communicate with other computing devices over one or more networks, such as the network 82. Examples of the network access device include one or more wired network interfaces and wireless network interfaces. Examples of such wireless network interfaces of the network access device 218 include wireless wide area network (WWAN) interfaces (including cellular networks) and wireless local area network (WLANs) interfaces. In other examples, other types of wireless interfaces can be used for the network access device 218.

In some embodiments, the media server application 212 is configured to stream media content, such as music or other audio, video, or other suitable forms of media content. The media server application 212 includes a media stream service 222, a media application interface 224, and a media data store 226. The media stream service 222 operates to buffer media content, such as media content items 230A, 230B, and 230N (collectively 230), for streaming to one or more streams 232A, 232B, and 232N (collectively 232).

The media application interface 224 can receive requests or other communication from media playback devices or other systems, such as the PMSA system 110, to retrieve media content items from the media content server 200. For example, in FIG. 2, the media application interface 224 receives communication from the PMSA system 110, such as the caching management engine 174 thereof, to receive media content from the media content server 200.

In some embodiments, the media data store 226 stores media content items 234, media content metadata 236, media contexts 238, user accounts 240, and taste profiles 242. The media data store 226 may comprise one or more databases and file systems. Other embodiments are possible as well.

As discussed herein, the media content items 234 (including the media content items 230) may be audio, video, or any other type of media content, which may be stored in any format for storing media content.

The media content metadata 236 provide various information associated with the media content items 234. In some embodiments, the media content metadata 236 includes one or more of title, artist name, album name, length, genre, mood, era, etc.

The media content metadata 236 operates to provide various pieces of information associated with the media content items 234. In some embodiments, the media content metadata 236 includes one or more of title, artist name, album name, length, genre, mood, era, etc.

In some embodiments, the media content metadata 236 includes acoustic metadata, cultural metadata, and explicit metadata. The acoustic metadata may be derived from analysis of the track refers to a numerical or mathematical representation of the sound of a track. Acoustic metadata may include temporal information such as tempo, rhythm, beats, downbeats, patterns, sections, or other structures. Acoustic metadata may also include spectral information such as melody, pitch, harmony, timbre, chroma, loudness, vocalness, or other possible features. Acoustic metadata may take the form of one or more vectors, matrices, lists, tables, and other data structures. Acoustic metadata may be derived from analysis of the music signal. One form of acoustic metadata, commonly termed an acoustic fingerprint, may uniquely identify a specific track. Other forms of acoustic metadata may be formed by compressing the content of a track while retaining some or all of its musical characteristics.

The cultural metadata refers to text-based information describing listeners' reactions to a track or song, such as styles, genres, moods, themes, similar artists and/or songs, rankings, etc. Cultural metadata may be derived from expert opinion such as music reviews or classification of music into genres. Cultural metadata may be derived from listeners through websites, chatrooms, blogs, surveys, and the like. Cultural metadata may include sales data, shared collections, lists of favorite songs, and any text information that may be used to describe, rank, or interpret music. Cultural metadata may also be generated by a community of listeners and automatically retrieved from Internet sites, chat rooms, blogs, and the like. Cultural metadata may take the form of one or more vectors, matrices, lists, tables, and other data structures. A form of cultural metadata particularly useful for comparing music is a description vector. A description vector is a multi-dimensional vector associated with a track, album, or artist. Each term of the description vector indicates the probability that a corresponding word or phrase would be used to describe the associated track, album or artist.

The explicit metadata refers to factual or explicit information relating to music. Explicit metadata may include album and song titles, artist and composer names, other credits, album cover art, publisher name and product number, and other information. Explicit metadata is generally not derived from the music itself or from the reactions or opinions of listeners.

At least some of the metadata 236, such as explicit metadata (names, credits, product numbers, etc.) and cultural metadata (styles, genres, moods, themes, similar artists and/or songs, rankings, etc.), for a large library of songs or tracks can be evaluated and provided by one or more third party service providers. Acoustic and cultural metadata may take the form of parameters, lists, matrices, vectors, and other data structures. Acoustic and cultural metadata may be stored as XML, files, for example, or any other appropriate file type. Explicit metadata may include numerical, text, pictorial, and other information. Explicit metadata may also be stored in an XML or other file. All or portions of the metadata may be stored in separate files associated with specific tracks. All or portions of the metadata, such as acoustic fingerprints and/or description vectors, may be stored in a searchable data structure, such as a k-D tree or other database format.

Referring still to FIG. 3, each of the media contexts 238 is used to identify one or more media content items 234. In some embodiments, the media contexts 238 are configured to group one or more media content items 234 and provide a particular context to the group of media content items 234. Some examples of the media contexts 238 include albums, artists, playlists, and individual media content items. By way of example, where a media context 238 is an album, the media context 238 can represent that the media content items 234 identified by the media context 238 are associated with that album.

As described above, the media contexts 238 can include playlists 239. The playlists 238 are used to identify one or more of the media content items 234. In some embodiments, the playlists 238 identify a group of the media content items 234 in a particular order. In other embodiments, the playlists 238 merely identify a group of the media content items 234 without specifying a particular order. Some, but not necessarily all, of the media content items 234 included in a particular one of the playlists 238 are associated with a common characteristic such as a common genre, mood, or era.

In some embodiments, a user can listen to media content items in a playlist 238 by selecting the playlist 238 via a media playback device 104, such as the PMSA system 110. The media playback device 104 then operates to communicate with the media delivery system 112 so that the media delivery system 112 retrieves the media content items identified by the playlist 238 and transmits data for the media content items to the media playback device 104 for playback.

In some embodiments, the playlist 238 includes a playlist title and a list of content media item identifications. The playlist title is a title of the playlist, which can be provided by a user using the media playback device 104. The list of content media item identifications includes one or more media content item identifications (IDs) that refer to respective media content items 170.

Each media content item is identified by a media content item ID and includes various pieces of information, such as a media content item title, artist identification (e.g., individual artist name or group name, or multiple artist names or group names), and media content item data. In some embodiments, the media content item title and the artist ID are part of the media content metadata 236, which can further include other attributes of the media content item, such as album name, length, genre, mood, era, etc. as described herein.

At least some of the playlists 238 may include user-created playlists. For example, a user of a media streaming service provided using the media delivery system 112 can create a playlist 238 and edit the playlist 238 by adding, removing, and rearranging media content items in the playlist 238. A playlist 238 can be created and/or edited by a group of users together to make it a collaborative playlist. In some embodiments, user-created playlists can be available to a particular user only, a group of users, or to the public based on a user-definable privacy setting.

In some embodiments, when a playlist is created by a user or a group of users, the media delivery system 112 operates to generate a list of media content items recommended for the particular user or the particular group of users. In some embodiments, such recommended media content items can be selected based at least on the taste profiles 242 as described herein. Other information or factors can be used to determine the recommended media content items. Examples of determining recommended media content items are described in U.S. patent application Ser. No. 15/858,377, titled MEDIA CONTENT ITEM RECOMMENDATION SYSTEM, filed Dec. 29, 2017, the disclosure of which is hereby incorporated by reference in its entirety.

In addition or alternatively, at least some of the playlists 238 are created by a media streaming service provider. For example, such provider-created playlists can be automatically created by the media delivery system 112. In some embodiments, a provider-created playlist can be customized to a particular user or a particular group of users. By way of example, a playlist for a particular user can be automatically created by the media delivery system 112 based on the user's listening history (e.g., the user's taste profile) and/or listening history of other users with similar tastes. In other embodiments, a provider-created playlist can be configured to be available for the public in general. Provider-created playlists can also be sharable with to other users.

The user accounts 240 are used to identify users of a media streaming service provided by the media delivery system 112. In some embodiments, a user account 240 allows a user to authenticate to the media delivery system 112 and enable the user to access resources (e.g., media content items, playlists, etc.) provided by the media delivery system 112. In some embodiments, the user can use different devices (e.g., the PMSA system 110 and the mobile computing device 118) to log into the user account and access data associated with the user account in the media delivery system 112. User authentication information, such as a username, an email account information, a password, and other credentials, can be used for the user to log into his or her user account.

The taste profiles 242 contain records indicating media content tastes of users. A taste profile can be associated with a user and used to maintain an in-depth understanding of the music activity and preference of that user, enabling personalized recommendations, taste profiling and a wide range of social music applications. Libraries and wrappers can be accessed to create taste profiles from a media library of the user, social website activity and other specialized databases to mine music preferences.

In some embodiments, each taste profile 242 is a representation of musical activities, such as user preferences and historical information about the users' consumption of media content, and can include a wide range of information such as artist plays, song plays, skips, dates of listen by the user, songs per day, playlists, play counts, start/stop/skip data for portions of a song or album, contents of collections, user rankings, preferences, or other mentions received via a client device, or other media plays, such as websites visited, book titles, movies watched, playing activity during a movie or other presentations, ratings, or terms corresponding to the media, such as "comedy", "sexy", etc.

In addition, the taste profiles 242 can include other information. For example, the taste profiles 242 can include libraries and/or playlists of media content items associated with the user. The taste profiles 242 can also include information about the user's relationships with other users (e.g., associations between users that are stored by the media delivery system 112 or on a separate social media site).

The taste profiles 242 can be used for a number of purposes. One use of taste profiles is for creating personalized playlists (e.g., personal playlisting). An API call associated with personal playlisting can be used to return a playlist customized to a particular user. For example, the media content items listed in the created playlist are constrained to the media content items in a taste profile associated with the particular user. Another example use case is for event recommendation. A taste profile can be created, for example, for a festival that contains all the artists in the festival. Music recommendations can be constrained to artists in the taste profile. Yet another use case is for personalized recommendation, where the contents of a taste profile are used to represent an individual's taste. This API call uses a taste profile as a seed for obtaining recommendations or playlists of similar artists. Yet another example taste profile use case is referred to as bulk resolution. A bulk resolution API call is used to resolve taste profile items to pre-stored identifiers associated with a service, such as a service that provides metadata about items associated with the taste profile (e.g., song tempo for a large catalog of items). Yet another example use case for taste profiles is referred to as user-to-user recommendation. This API call is used to discover users with similar tastes by comparing the similarity of taste profile item(s) associated with users.

A taste profile 242 can represent a single user or multiple users. Conversely, a single user or entity can have multiple taste profiles 242. For example, one taste profile can be generated in connection with a user's media content play activity, whereas another separate taste profile can be generated for the same user based the user's selection of media content items and/or artists for a playlist.

Referring still to FIG. 3, the PMSA server 202 operates to provide various functionalities to the PMSA system 110. In some embodiments, the PMSA server 202 includes a personal media streaming appliance (PMSA) server application 250, a processing device 252, a memory device 254, and a network access device 256. The processing device 252, the memory device 254, and the network access device 256 may be similar to the processing device 214, the memory device 216, and the network access device 218, respectively, which have each been previously described.

In some embodiments, the PMSA server application 250 operates to interact with the PMSA system 110 and enable the PMSA system 110 to perform various functions, such as receiving a user manual input, displaying information, providing notifications, performing power management, providing location-based services, and authenticating one or more users for the PMSA system 110. The PMSA server application 250 can interact with other servers, such as the media content server 200 and the voice interaction server 204, to execute such functions.

Referring to FIG. 3, the voice interaction server 204 operates to provide various voice-related functionalities to the PMSA system 110. In some embodiments, the voice interaction server 204 includes a voice interaction server application 270, a processing device 272, a memory device 274, and a network access device 276. The processing device 272, the memory device 274, and the network access device 276 may be similar to the processing device 214, the memory device 216, and the network access device 218, respectively, which have each been previously described.

In some embodiments, the voice interaction server application 270 operates to interact with the PMSA system 110 and enable the PMSA system 110 to perform various voice-related functions, such as voice feedback and voice notifications. In some embodiments, the voice interaction server application 270 is configured to receive data (e.g., speech-to-text (STT) data) representative of a voice input received via the PMSA system 110 and process the data to determine a user command (e.g., a user request or instruction). In some embodiments, at least one of the media content server 200, the PMSA server 202, and the voice interaction server 204 may be used to perform one or more functions corresponding the determined user command. In some instances, voice interaction server application 270 can provide notifications to the user based on media playback actions, such as announcing that a new track, radio station, and/or genre has been selected.

Figure 4:
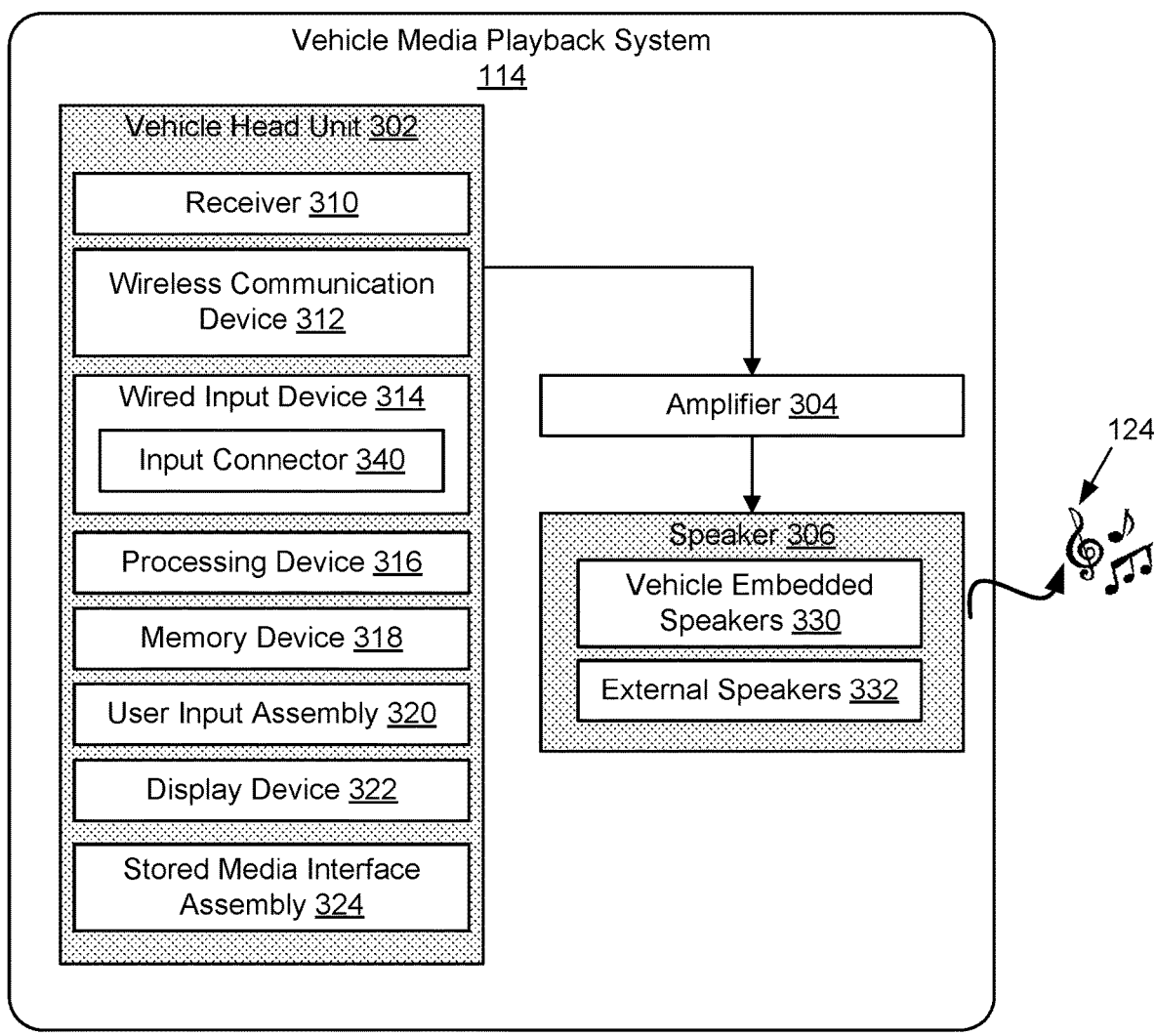
FIG. 4 is a block diagram of an example embodiment of a vehicle media playback system.

FIG. 4 is a block diagram of an example embodiment of the vehicle media playback system 114. In this example, the vehicle media playback system 114 includes a vehicle head unit 302, an amplifier 304, and a speaker 306.

The vehicle head unit 302 is configured to receive a user input and generate media content from various sources. In this example, the vehicle head unit 302 includes a receiver 310, a wireless communication device 312, a wired input device 314, a processing device 316, a memory device 318, a user input assembly 320, a display device 322, and a stored media interface assembly 324.

The receiver 310 operates to receive media content signals from various external sources. The received signals can then be used to generate media output by the vehicle media playback system 264. Some embodiments of the receiver 310 include one or more tuners for receiving radio signals such as FM or AM radio signals. Other embodiments of the receiver 310 include a receiver for receiving satellite radio signals and/or a receiver for receiving internet radio signals.

The wireless communication device 312 operates to communicate with other devices using wireless data signals. The wireless communication device 312 can include one or more of a Bluetooth transceiver and a Wi-Fi transceiver. The wireless data signal may comprise a media content signal such as an audio or video signal. In some embodiments, the wireless communication device 312 is used to enable the vehicle media playback system 114 to wirelessly communicate with the PMSA system 110 and receive the media content signal 164 (FIG. 2) from the PMSA system 110 via an in-vehicle wireless network. The in-vehicle wireless network between the PMSA system 110 and the vehicle media playback system 114 can be configured similarly to the in-vehicle wireless data communication 122 (FIG. 2).

The wired input device 314 provides an interface configured to receive a cable for providing media content and/or commands. The wired input device 314 includes an input connector 340 configured to receive a plug extending from a media playback device for transmitting a signal for media content. In some embodiments, the wired input device 314 can include an auxiliary input jack (AUX) for receiving a plug from a media playback device that transmits analog audio signals. The wired input device 314 can also include different or multiple input jacks for receiving plugs from media playback devices that transmit other types of analog or digital signals (e.g., USB, HDMI, Composite Video, YPbPr, DVI). In some embodiments, the wired input device 314 is also used to receive instructions from other devices.

In some embodiments, the wired input device 314 provides the input connector 340 (e.g., an AUX port) for receiving a connector 552 extending from the PMSA system 110, as illustrated in FIG. 6. The media content signal 164 is then transmitted from the PMSA system 110 to the vehicle media playback system 114 via the cable 550, the connector 552, and the input connector 340.

The processing device 316 operates to control various devices, components, and elements of the vehicle media playback system 114. The processing device 316 can be configured similar to the processing device 148 (FIG. 2) and, therefore, the description of the processing device 316 is omitted for brevity purposes.

In some embodiments, the processing device 316 operates to process the media content signal 164 received from the PMSA system 110 and convert the signal 164 to a format readable by the vehicle media playback system 114 for playback.

The memory device 318 is configured to store data and instructions that are usable to control various devices, components, and elements of the vehicle media playback system 114. The memory device 318 can be configured similar to the memory device 150 (FIG. 2) and, therefore, the description of the memory device 318 is omitted for brevity purposes.

The user input assembly 320 includes one or more input devices for receiving user input from users for controlling the vehicle media playback system 114. In some embodiments, the user input assembly 320 includes multiple knobs, buttons, and other types of input controls for adjusting volume, selecting sources and content, and adjusting various output parameters. In some embodiments, the various input devices are disposed on or near a front surface of the vehicle head unit 302. The various input devices can also be disposed on the steering wheel of the vehicle or elsewhere. Additionally or alternatively, the user input assembly 320 can include one or more touch sensitive surfaces, which can be incorporated in the display device 322.

The display device 322 displays information. In some embodiments, the display device 322 includes a liquid crystal display (LCD) panel for displaying textual information about content and/or settings of the vehicle media playback system 114. The display device 322 can also include other types of display panels such as a light emitting diode (LED) panel. In some embodiments, the display device 322 can also display image or video content.

The stored media interface assembly 324 reads media content stored on a physical medium. In some embodiments, the stored media interface assembly 324 comprises one or more devices for reading media content from a physical medium such as a compact disc or cassette tape.

The amplifier 304 operates to amplify a signal received from the vehicle head unit 302 and transmits the amplified signal to the speaker 306. In this manner, the media output 124 can be played back at a greater volume. The amplifier 304 may include a power source to power the amplification.

The speaker 306 operates to produce an audio output (e.g., the media output 124) based on an electronic signal. The speaker 306 can include one or more vehicle embedded speakers 330 disposed at various locations within the vehicle 80. In some embodiments, separate signals are received for at least some of the speakers (e.g., to provide stereo or surround sound).

In other embodiments, the speaker 306 can include one or more external speakers 332 which are arranged within the vehicle 80. Users may bring one or more external speakers 332 into the vehicle 80 and connect the external speakers 332 to the vehicle head unit 302 using a wired interface or a wireless interface. In some embodiments, the external speakers 332 can be connected to the vehicle head unit 302 using Bluetooth. Other wireless protocols can be used to connect the external speakers 332 to the vehicle head unit 302. In other embodiments, a wired connection (e.g., a cable) can be used to connect the external speakers 332 to the vehicle head unit 302. Examples of the wired connection include an analog or digital audio cable connection and a universal serial bus (USB) cable connection. The external speaker 332 can also include a mechanical apparatus for attachment to a structure of the vehicle.

Figure 5:
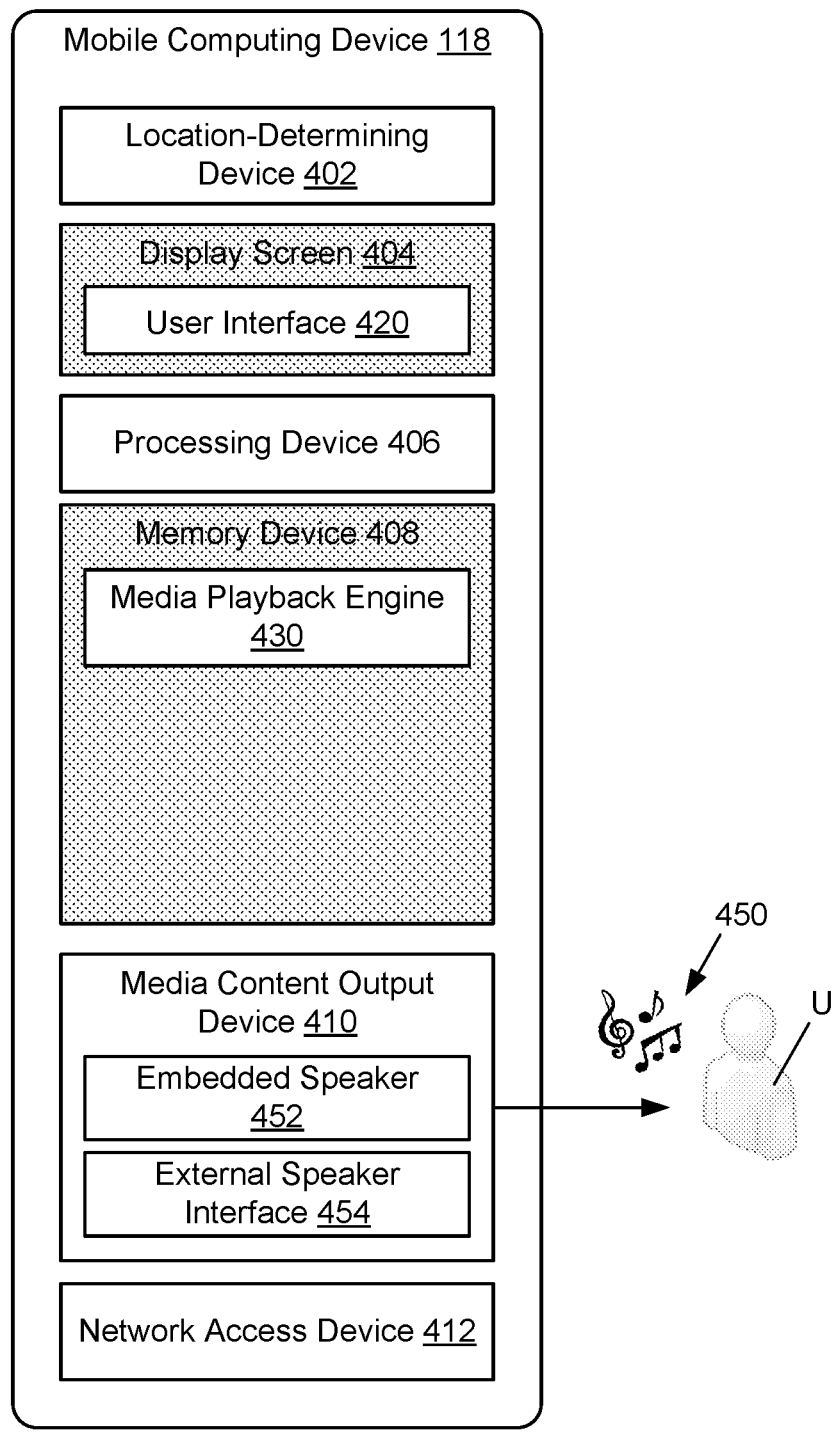
FIG. 5 is a block diagram of an example embodiment of a mobile computing device.

FIG. 5 is a block diagram of an example embodiment of the mobile computing device 118 of FIG. 1.

Similar to the PMSA system 110, the mobile computing device 118 can also be used to play media content. For example, the mobile computing device 118 is configured to play media content that is provided (e.g., streamed or transmitted) by a system external to the mobile computing device 118, such as the media delivery system 112, another system, or a peer device. In other examples, the mobile computing device 118 operates to play media content stored locally on the mobile computing device 118. In yet other examples, the mobile computing device 118 operates to play media content that is stored locally as well as media content provided by other systems.

In some embodiments, the mobile computing device 118 is a handheld or portable entertainment device, smartphone, tablet, watch, wearable device, or any other type of computing device capable of playing media content. In other embodiments, the mobile computing device 118 is a laptop computer, desktop computer, television, gaming console, set-top box, network appliance, blue-ray or DVD player, media player, stereo, or radio.

As described herein, the mobile computing device 118 is distinguished from the PMSA system 110 in various aspects. For example, unlike the PMSA system 110, the mobile computing device 118 is not limited to playing media content, but configured for a wide range of functionalities in various situations and places. The mobile computing device 118 is capable of running a plurality of different software applications for different purposes. The mobile computing device 118 enables the user to freely start or stop activation of such individual software applications.

In at least some embodiments, the mobile computing device 118 includes a location-determining device 402, a display screen 404, a processing device 406, a memory device 408, a content output device 410, and a network access device 412. Other embodiments may include additional, different, or fewer components. For example, some embodiments may include a recording device such as a microphone or camera that operates to record audio or video content.

The location-determining device 402 is a device that determines the location of the mobile computing device 118. In some embodiments, the location-determining device 402 uses one or more of Global Positioning System (GPS) technology (which may receive GPS signals), Global Navigation Satellite System (GLONASS), cellular triangulation technology, network-based location identification technology, Wi-Fi positioning systems technology, and combinations thereof.

The display screen 404 is configured to display information. In addition, the display screen 404 is configured as a touch sensitive display and includes a user interface 420 for receiving a user input from a selector (e.g., a finger, stylus etc.) controlled by the user U. In some embodiments, therefore, the display screen 404 operates as both a display device and a user input device. The touch sensitive display screen 404 operates to detect inputs based on one or both of touches and near-touches. In some embodiments, the display screen 404 displays a graphical user interface for interacting with the mobile computing device 118. Other embodiments of the display screen 404 do not include a touch sensitive display screen. Some embodiments include a display device and one or more separate user interface devices. Further, some embodiments do not include a display device.

In some embodiments, the processing device 406 comprises one or more central processing units (CPU). In other embodiments, the processing device 406 additionally or alternatively includes one or more digital signal processors, field-programmable gate arrays, or other electronic circuits.

The memory device 408 operates to store data and instructions. In some embodiments, the memory device 408 stores instructions for a media playback engine 430.

The memory device 408 may be configured similarly to the memory device 150 (FIG. 2) and, therefore, the description of the memory device 408 is omitted for brevity purposes.

The media playback engine 430 operates to play media content to the user U. As described herein, the media playback engine 430 is configured to communicate with the media delivery system 112 to receive one or more media content items (e.g., through the stream media 232). In other embodiments, the media playback engine 430 is configured to play media content that is locally stored in the mobile computing device 118.

In some embodiments, the media playback engine 430 operates to retrieve one or more media content items that are either locally stored in the mobile computing device 118 or remotely stored in the media delivery system 114. In some embodiments, the media playback engine 430 is configured to send a request to the media delivery system 114 for media content items and receive information about such media content items for playback.

Referring still to FIG. 5, the content output device 410 operates to output media content. In some embodiments, the content output device 410 generates media output 450 for the user U. In some embodiments, the content output device 410 includes one or more embedded speakers 452 which are incorporated in the mobile computing device 118. Therefore, the mobile computing device 118 can be used as a stand-alone device that generates the media output 450.

In addition, some embodiments of the mobile computing device 118 include an external speaker interface 454 as an alternative output of media content. The external speaker interface 454 is configured to connect the mobile computing device 118 to another system having one or more speakers, such as headphones, portal speaker assemblies, and the vehicle media playback system 114, so that the media output 450 is generated via the speakers of the other system external to the mobile computing device 118. Examples of the external speaker interface 454 include an audio output jack, a Bluetooth transmitter, a display panel, and a video output jack. Other embodiments are possible as well. For example, the external speaker interface 454 is configured to transmit a signal through the audio output jack or Bluetooth transmitter that can be used to reproduce an audio signal by a connected or paired device such as headphones or a speaker.

The network access device 412 operates to communicate with other computing devices over one or more networks, such as the network 116 and the in-vehicle wireless data communication 122. Examples of the network access device 412 include wired network interfaces and wireless network interfaces. Wireless network interfaces includes infrared, BLUETOOTH® wireless technology, 802.11a/b/g/n/ac, and cellular or other radio frequency interfaces in at least some possible embodiments.

FIG. 6 schematically illustrates an example embodiment of the PMSA system 110 of FIG. 1. In this example, the PMSA system 110 includes a personal media streaming appliance (PMSA) 500 and a docking device 502.

As described herein, the PMSA system 110 is sized to be relatively small so that the PMSA system 110 can be easily mounted to a structure (e.g., a dashboard or head unit) of the vehicle 80 where the user can conveniently manipulate the PMSA system 110. By way of example, the PMSA system 110 is configured to be smaller than a typical mobile computing device, such as a smartphone. Further, the PMSA 500 provides a simplified user interface for controlling playback of media content. For example, the PMSA 500 has a limited set of physical control elements, such as a single rotary knob and one or more physical buttons as described below, so that the user can easily control the PMSA system 110 in the vehicle 80 (FIG. 1).

The PMSA 500 is configured to include at least some of the devices of the PMSA system 110 as illustrated with reference to FIG. 2. In some embodiments, the PMSA 500 includes all of the devices of the PMSA system 110 as illustrated in FIG. 2.

As illustrated also in FIG. 2, some embodiments of the PMSA 500 includes the user input device 130 that includes the manual input device 160 and the sound detection device 162. Some embodiments of the manual input device 160 include a control knob 510 and one or more physical buttons 512.

In some embodiments, the control knob 510 is configured to be maneuverable in multiple ways. For example, the control knob 510 provides a plurality of regions on a knob face 514 that are independently depressible upon receiving a user's pressing action against the knob face 514. In the illustrated example, the control knob 510 has five regions 516 (e.g., up, down, left, right, and middle) that are separately depressible. At least some of the regions 516 are configured to receive inputs of different user commands (e.g., requests or instructions).

In other embodiments, the control knob 510 is configured to be manipulated in different ways, such as tilting in multiple directions or sliding in multiple directions.

In addition, the control knob 510 is configured to be rotatable. For example, the user can hold the control knob 510 and rotate with respect to a body 520 of the PMSA 500. The control knob 510 can be rotatable in both directions 522 (e.g., clockwise and counterclockwise). In other embodiments, the control knob 510 is configured to rotate in only one direction.

The control knob 510 is used to receive user inputs for controlling playback of media content. In addition or alternatively, the control knob 510 can be used to receive user inputs for other purposes or functions.

The control knob 510 can be configured to provide feedback to a user as the control knob 510 is rotated. For instance, control knob 510 interfaces with other components to emit a clicking sound, haptic feedback, mechanical feedback, and/or the like, as the control knob 510 is rotated. Feedback can be provided at intervals and the intervals can vary depending on the implementation. Feedback intervals are typically evenly spaced.

Typically, feedback intervals are at least every 5 degrees but no greater than 30 degrees. As one example, feedback can be provided every 15 degrees of rotation. As another example, feedback can be provided every 10 degrees of rotation. As yet another example, feedback can be provided every 20 degrees of rotation. Other feedback intervals are contemplated.

In some embodiments, feedback intervals are provided at predetermined angles of rotation and correspond to different media playback functionality. For example, feedback (e.g., haptic or mechanical feedback) is provided at 20 degrees of rotation, at 70 degrees of rotation, and at 120 degrees of rotation. As a user turns the control knob 510 to the different positions providing feedback, different media playback actions are taken. For example, at 20 degrees of rotation, a new track in the current playlist is queued; at 70 degrees of rotation, a new playlist in the same genre is queued; and at 120 degrees of rotation a new playlist in a new genre is queued. Other positions of feedback are contemplated.

The control knob 510 is configured to obtain rotational data when the control knob 510 is rotated. Rotational data can include raw or processed data regarding knob rotation, such as rotational speed, rotational distance, starting and ending positions of a rotation, angle of rotation, etc. One or more sensors are arranged and configured to measure rotation of the control knob 510. Typically, optical sensors are used to measure and determine knob rotation. An example embodiment of a control knob 510 configuration for obtaining rotational data is shown in, and described below with reference to, FIG. 13. In one embodiment, the one or more sensors include a Hall effect sensor.

Figure 13:
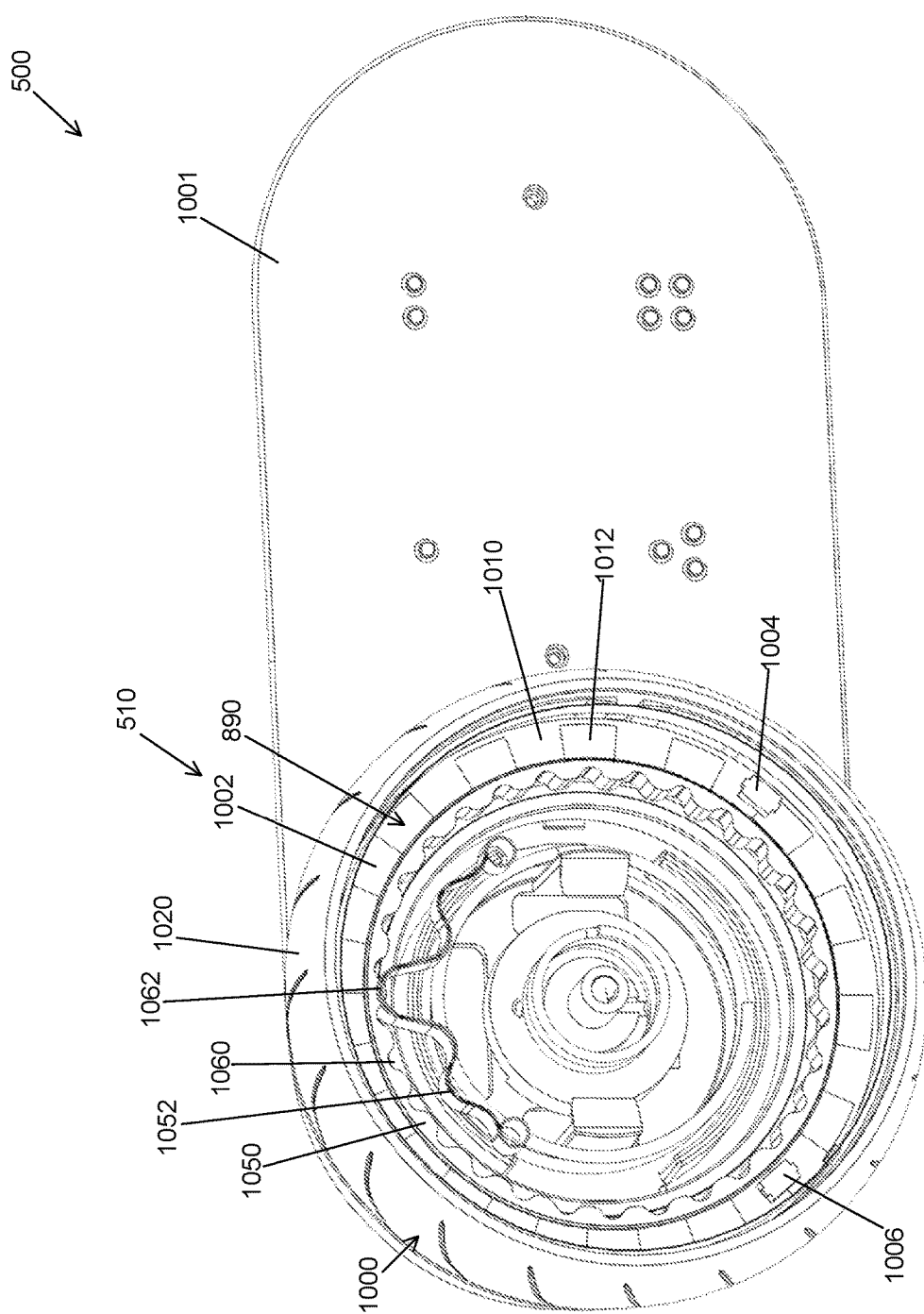
FIG. 13 is a front perspective view of an internal structure of an example control knob assembly used in the PMSA system of FIG. 2.

Other configurations can be used for measuring and determining knob rotation. For example, in one implementation, control knob 510 is a rotary switch. In another implementation, knob rotation is determined using DC current output from a standard brushed motor. In another implementation, an accelerometer is placed in a position away from a center spin axis and used to determine knob rotation. An example embodiment of control knob 510 is shown in FIG. 13 and described in greater detail below.

The physical buttons 512 are configured to be depressed upon receiving a user's pressing action against the physical buttons 512. In the illustrated example, the PMSA 500 has four physical buttons 511A-512D. In some embodiments, each of the physical buttons 512 is configured to receive a single user command. In other embodiments, at least one of the physical buttons 512 is configured to receive multiple user commands.

In some embodiments, the physical buttons 512 are used as buttons that are preset to be associated with particular media content, thereby facilitating playback of such media content. In these embodiments, the physical buttons 512 are also referred to as preset buttons 512.

In addition, the PMSA 500 also includes the display screen 132. In some embodiments, the display screen 132 is arranged at the knob face 514 of the control knob 510. As described herein, in some embodiments, the display screen 132 does not include a touch sensitive display screen, and is configured as a display device only. In other embodiments, however, the display screen 132 can be configured to be touch sensitive and receive a user input through the display screen 132 as well.

Referring still to FIG. 6, the docking device 502 is configured to mount the PMSA 500 to a structure of the vehicle 80. The docking device 502 is configured to removably mount the PMSA 500 thereto. The docking device 502 is further configured to attach to a structure of the vehicle 80 (FIG. 1) so that the PMSA 500 is positioned at the structure of the vehicle 80.

In some embodiments, an interface between the PMSA 500 and the docking device 502 is configured to prevent the PMSA 500 from rotating relative to the docking device 502 when the control knob 510 is manipulated by a user. For example, the docking device 502 has a portion (e.g., a front portion of the docking device 502) configured to interlock a corresponding portion of the PMSA 500 (e.g., a rear portion of the PMSA 500) when the PMSA 500 is mounted to the docking device 502 such that the portion of the docking device 502 and the corresponding portion of the PMSA 500 form the interface therebetween.

In addition or alternatively, the PMSA 500 and the docking device 502 include magnetic materials at the interface therebetween so that the PMSA 500 and the docking device 502 are magnetically coupled to each other.

In some embodiments, the docking device 502 includes one or more electrical contacts 530 that are electrically connected to corresponding electrical contacts (not shown in FIG. 6) of the PMSA 500 when the PMSA 500 is mounted to the docking device 502. Such electrical connection between the PMSA 500 and the docking device 502 is provided for various functions.

First, as described herein, the PMSA 500 does not include a battery sufficient for a prolonged use without an external power supply. In some embodiments, the PMSA 500 is primarily powered by a vehicle power supply 540. In some embodiments, the docking device 502 has a power receiving line 544 for connection to the vehicle power supply 540. For example, the power receiving line 544 extends from the docking device 502 and has a power connector 546 at a free end that is configured to mate with a vehicle power outlet 542 (e.g., a 12V auxiliary power outlet) of the vehicle power supply 540. As such, the docking device 502 receives electric power from the vehicle power supply 540 via the power receiving line 544, and the electrical connection between the PMSA 500 and the docking device 502 is configured to deliver electric power from the docking device 502 to the PMSA 500.

Second, as described herein, the PMSA 500 does not have a speaker and is designed to transmit media content signals to the vehicle media playback system 114 so that the media content is played through the vehicle media playback system 114. In some embodiments, the docking device 502 includes a media content output line 550 (also referred to herein as a media content output cable) (e.g., an auxiliary (AUX) output) configured to connect with the vehicle media playback input connector 340 (e.g., an auxiliary (AUX) port) of the vehicle media playback system 114. The docking device 502 is configured to receive media content signals from the PMSA 500 via the electrical connection between the PMSA 500 and the docking device 502, and transmit the signals to the vehicle media playback system 114 via the media content output line 550. In the illustrated embodiment, the power receiving line 544 and the media content output line 550 are combined to be a single line extending from the docking device 502 until the power connector 546, and the media content output line 550 further extends (or branches out) from the power connector 546 and terminates at a media output connector 552. The media output connector 552 is configured to connect to the vehicle media playback input connector 340 of the vehicle media playback system 114. In other embodiments, the media content output line 550 and the power receiving line 544 extend separately from the docking device 502.

In other embodiments, one or more of the power receiving line 544 and the media content output line 550 are directly connected to, and extend from, the PMSA 500 so that electric power is directly supplied to the PMSA 500 without the docking device 502 involved, and that the media content is directly transmitted to the vehicle media playback system 114 without passing through the docking device 502.

Third, the electrical connection between the PMSA 500 and the docking device 502 can be used to detect connection between the PMSA 500 and the docking device 502.

Figure 7:
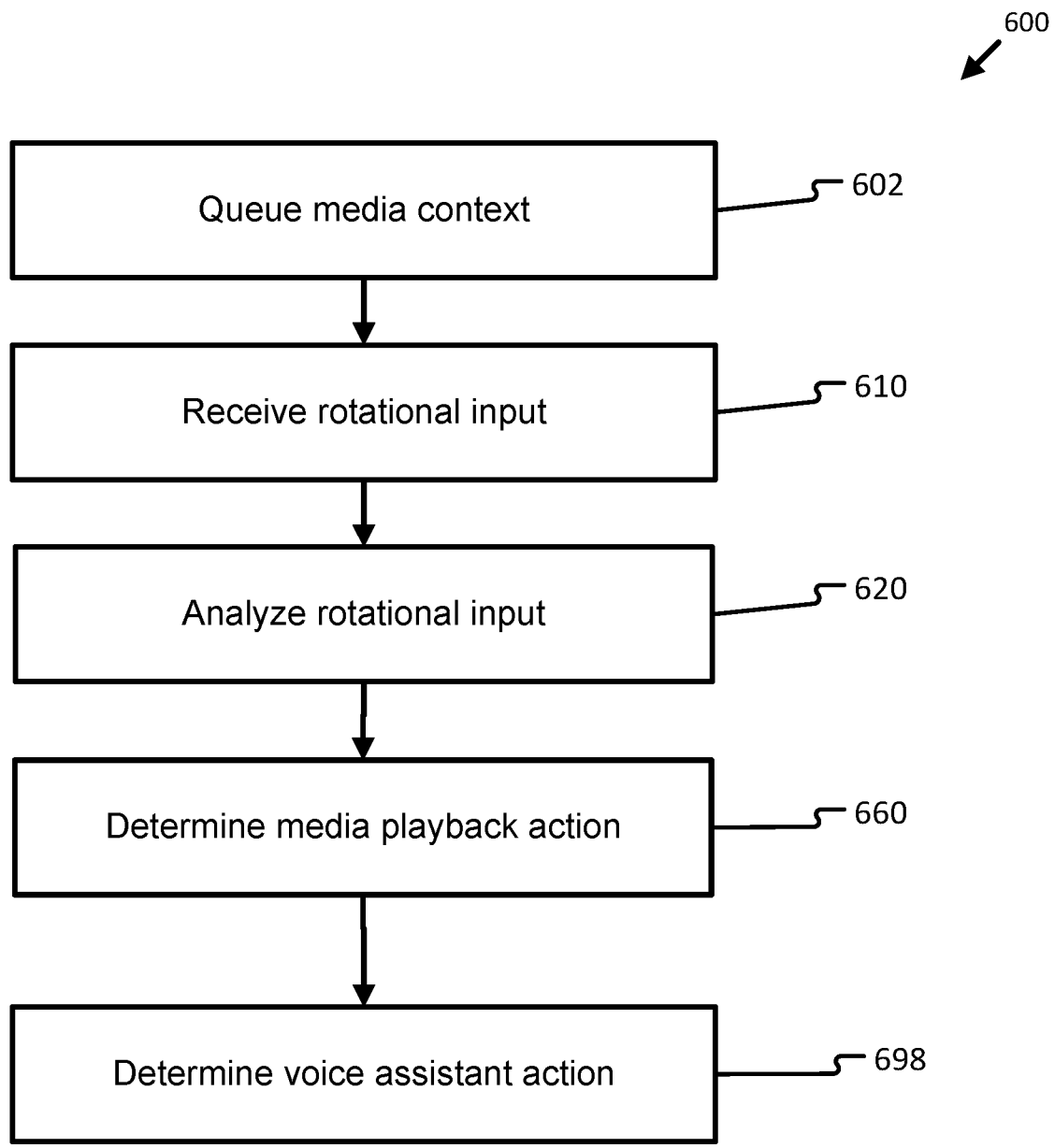
FIG. 7 illustrates an example method for queuing a media playlist.

FIG. 7 shows example method 600 for queuing media content for playback. Example method 600 includes queuing a media context (operation 602), receiving rotational input (operation 610), analyzing rotational input (operation 620), determining media playback action (operation 660), and determining voice assistant action (operation 698). The operations of example method 600 can be performed, for example, using example system 100 discussed with reference to FIGS. 1-6, above.

As discussed above, typical embodiments of a personal media streaming appliance (PMSA) disclosed herein include a rotatable knob/button and only a few additional buttons. Usually, possible media playback functionalities outnumber the quantity of buttons on the PMSA such that each media playback functionality cannot have a button dedicated to that functionality. Example method 600 provides operations enabling a user to access various media playback functionalities based on different turns of the rotatable knob.

Example method 600 begins by queuing a media context (operation 602). Typically, a media context is queued (operation 602) upon start-up of a PMSA, such as when a vehicle is turned on. Example embodiments of media contexts that can be queued are described above with reference to, at least, FIG. 3. In this example, content queued during operation 602 is determined by whether an existing user account is already associated with the PMSA, if a new user account is associated with the PMSA, or if no account is associated with the PMSA. Media content queued during operation 602 is selected from a music universe.

Figure 8:
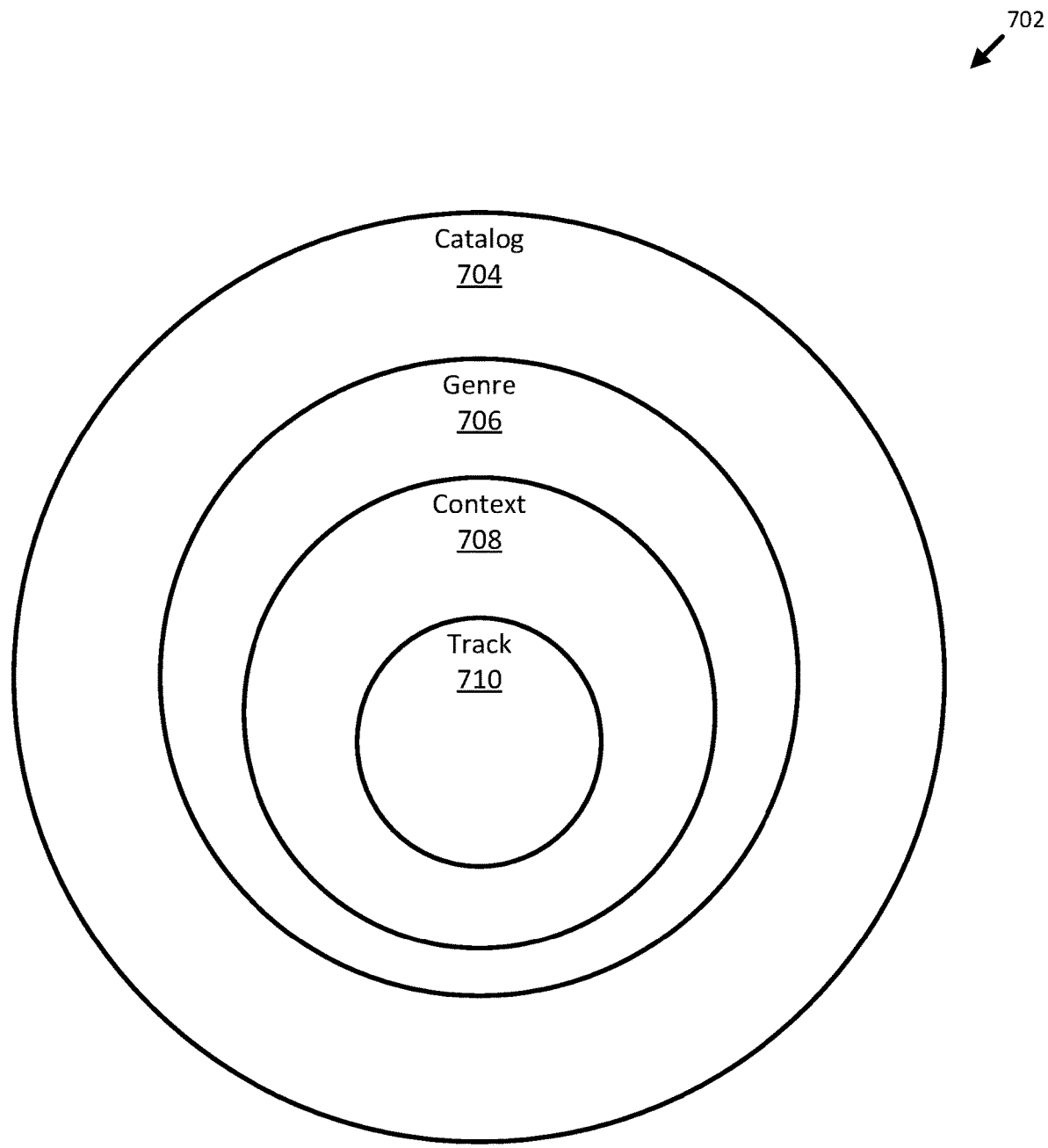
FIG. 8 is a schematic diagram of an example music universe.

Referring to FIG. 8, a schematic diagram of an example music universe 702 is shown. The example music universe 702 includes a music catalog 704. Generally, the music catalog 704 includes available media to stream to the PMSA. It will be appreciated that contents of music catalog 704 can change over time, for instance, as new media is generated and added to music catalog 704.

Within catalog 704, there are multiple genres 706. Generally, genre 706 is a grouping of media, where the media share one or more attributes. Examples of genres 706 include alternative, blues, jazz, pop, rock, soul, and world, to name just a few. Each genre 706 can include one or more sub-genres. Example sub-genres of the blues genre can include acoustic blues, gospel blues, Chicago blues, and piano blues.

A context 708 is a collection of tracks 710. In some instances, a context 708 has a fixed number of tracks or a fixed total run time. In other instances, a context 708 can add or modify tracks 710. Adding or modifying tracks 710 in context 708 can be based on various factors, for example, user interactivity, such as which tracks the user skips, and, if the final track 710 in a context 708 is played, additional tracks can be added that are similar to the tracks 710 already in context 708.

Typically, a context 708 is generated based on one or more seeds. Example seeds are artists and tracks (where a track can be a particular song by a particular artist). Using a given track and/or artist, the context 708 is populated using the characteristics of the track and/or artist, which can include reference to genres or sub-genres corresponding to, or similar to, the track and/or artist. In some instances, a context 708 is generated using a genre or sub-genre as a seed.

Referring again to FIG. 7, queuing a media context (operation 602) can include queueing one or more tracks of a context 708 as the media context. After queuing the media context (operation 602), the PMSA causes playback of the media content in the media context, usually in sequential order.

At some point during media playback, rotational input can be received (operation 610) from a rotatable button supported by the PMSA. Rotational input can include various attributes about how the rotatable button was rotated. For example, rotational input received during operation 610 can include rotational speed data, rotational direction data, and rotational magnitude data. Rotational input can include data regarding a starting position and an ending position of the rotatable button, a rotational start time and a rotational end time, and the like.

In some instances, rotational input received during operation 610 is received from a sensor arranged and configured to determine rotational attributes of the rotatable button. An example sensor is a Hall effect sensor.

After receiving rotational input (operation 610), the rotational input is analyzed (operation 620). Generally, analyzing rotational input (operation 620) includes processing the rotational input to determine one or more characteristics of a user's rotation of the rotatable button. Then the one or more characteristics are used to determine media playback action (operation 660).

Figure 9:
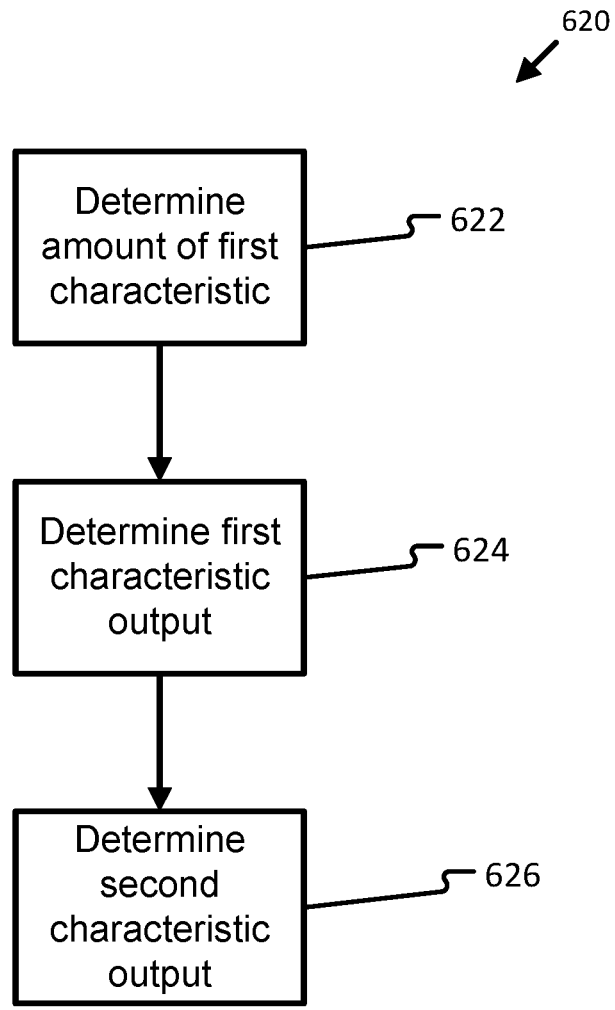
FIG. 9 illustrates example operations performed during the method of FIG. 7.

Referring now to FIG. 9, analyzing rotational input (operation 620) includes determining a first characteristic output and a second characteristic output. In other implementations, more or fewer characteristics can be determined. Analyzing rotational input (operation 620) includes determining an amount of a first characteristic (operation 622). In this example, the first characteristic is a magnitude of the turn. The turn magnitude is used in determining a first characteristic output (operation 624).

Generally, determining an amount of a first characteristic (operation 622) includes determining a magnitude value, which can be evaluated in terms of various metrics. The magnitude value is of a turn. A turn is a knob rotation that has a starting position and an ending position and that occurs within a predetermined time period.

In the example embodiment, turn magnitude is classified into three categories: a short turn, a medium turn, and a long turn. The terms "short," "medium," and "long" are relative only. The relative terminology is used to indicate that a first media playback action can be initiated with a first kind of turn, a second media playback action can be initiated with a second kind of turn that is typically more pronounced than the first kind, and a third media playback action can be initiated with a third kind of turn, where the third kind of turn is more pronounced than the second kind. In other implementations, turn magnitude can be classified into more or fewer categories. For instance, in one embodiment, turn magnitude is classified as either a small turn or a large turn. In another embodiment, turn magnitude can be classified into four different categories.

Example metrics include click number, angle of rotation, and arc length, to name a few. Then the turn magnitude can be classified into one of a few categories, where a range of values can fit within each category, as will be explained in greater detail below.

In some embodiments, turn magnitude is evaluated in terms of click number. Short turns are categorized as those being at least one click but no more than a predetermined number of clicks. For example, in some instances, only a single click is categorized as a short turn. In other implementations, rotating more than a single click is also categorized as a short turn. For example, rotating either one click or two clicks is categorized as a short turn. As another example, a rotation of at least one click but no greater than four clicks is categorized as a short turn.

Medium turns can be categorized as those being greater than the maximum number of clicks considered to be a short turn, but fewer than the minimum number of clicks considered to be a long turn. For example, if rotations of at least one click but no more than three clicks are categorized as short turns, then medium turns can be categorized as those having at least four clicks but no greater than some other number, such as eight clicks, where a turn of nine or more clicks is categorized as a long turn. Typically, long turns are categorized as rotations more than maximum number of clicks considered to be a medium turn.

Figure 11A:
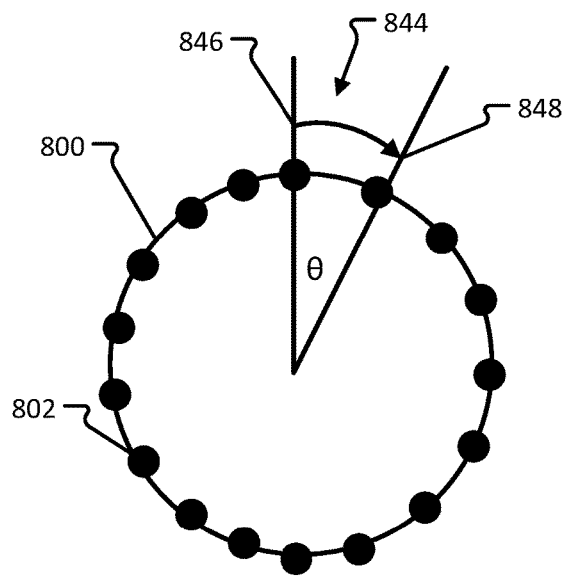
FIG. 11A is a schematic illustration of an example knob rotation received during the method of FIG. 7.
Figure 11B:
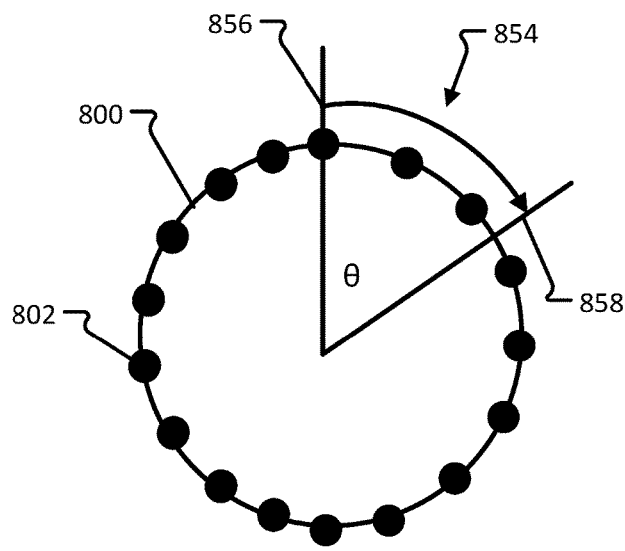
FIG. 11B is a schematic illustration of an example knob rotation received during the method of FIG. 7.
Figure 11C:
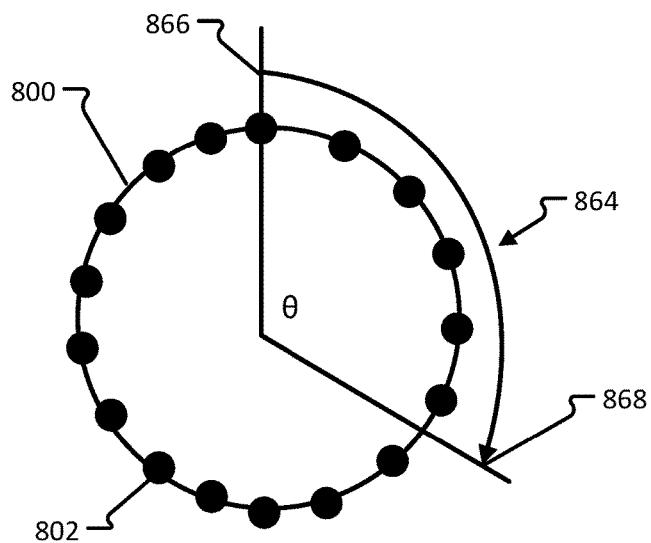
FIG. 11C is a schematic illustration of an example knob rotation received during the method of FIG. 7.

FIGS. 11A-11C are schematic illustrations of various rotational inputs for an example control knob 800, evaluated in terms of click number. Although specific examples of a short turn, medium turn, and long turn are shown in FIGS. 11A, 11B, and 11C, respectively, other turns can be categorized as short turns, medium turns, and long turns, as discussed above.

As shown, control knob 800 is configured to provide feedback at various rotational positions, shown schematically as feedback positions 802. At each feedback position 802, audible and/or tactile feedback is provided to the user. Feedback provided by control knob 800 can be termed "clicks" for purposes of discussion. Other embodiments of control knob 800 providing feedback can include more or fewer feedback positions. In one embodiment, control knob 800 has 32 feedback positions.

Figure 10A:
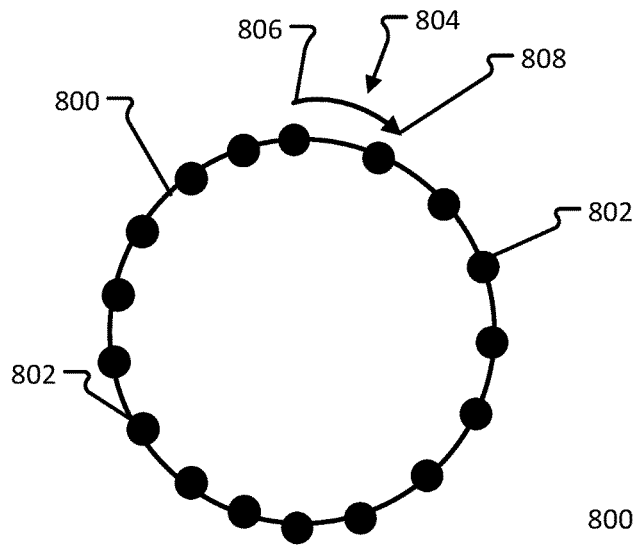
FIG. 10A is a schematic illustration of an example knob rotation received during the method of FIG. 7.

FIG. 10A shows a schematic example of a short turn 804. As shown in FIG. 10A, Control knob 800 has been rotated a single click, clockwise, during short turn 804. Short turn 804 has a starting point 806 and an ending point 808.

Figure 10B:
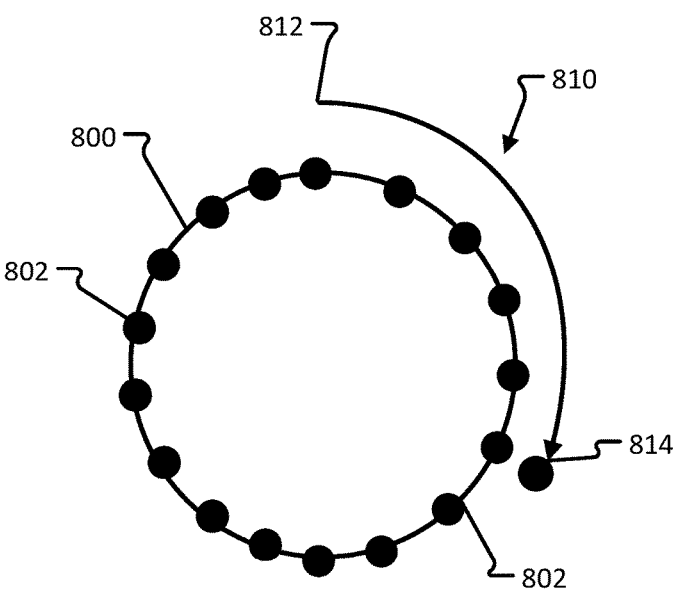
FIG. 10B is a schematic illustrations of an example knob rotation received during the method of FIG. 7.

FIG. 10B shows a schematic example of a medium turn 810. As shown in FIG. 10B, Control knob 800 has been rotated five clicks, clockwise, during medium turn 810. Medium turn 810 has a starting point 812 and an ending point 814. Approximately, medium turn 810 is a one-third rotation of Control knob 800.

Figure 10C:
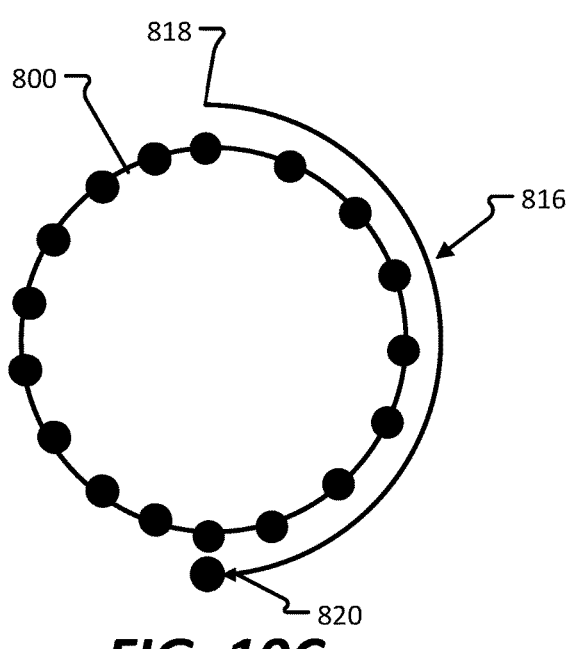
FIG. 10C is a schematic illustrations of an example knob rotation received during the method of FIG. 7.

FIG. 10C shows a schematic example of a long turn 816. As shown in FIG. 10C, Control knob 800 has been rotated eight clicks, clockwise, during long turn 816. Long turn 816 has a starting point 818 and an ending point 820. Approximately, long turn 816 is a one-half rotation of Control knob 800.

In some embodiments, turn magnitude is evaluated in terms of angle of rotation. An angle of rotation can be defined as the angle formed between two rays extending from a center point of the PMSA knob through a point on the circumference or exterior of the knob. One ray is formed using a starting position when a user began knob rotation and the other ray is formed using the ending position when the user stopped knob rotation.

Various ranges of angle of rotation can be classified as a short turn. For example, an angle of rotation greater than 0 degrees but no more than 15 degrees can be classified as a short turn. As another example, an angle of rotation greater than 0 degrees but no more than 30 degrees can be classified as a short turn. Other ranges are contemplated.

Similarly, various ranges of angle of rotation can be classified as a medium turn. The lower end of the medium turn range is typically dictated by the maximum of the short turn range. For example, if a short turn is any angle of rotation more than 0 degrees but no more than 30 degrees, a medium turn is an angle of rotation greater than 30 degrees but no more than 80 degrees. Other ranges are contemplated.

Further, various ranges of angle rotation can be classified as a long turn. The lower end of the long turn range is typically dictated by the maximum of the medium turn range. For example, if a medium turn is any angle of rotation greater than 30 degrees but no more than 80 degrees, a long turn is an angle of rotation greater than 80 degrees.

In some instances, an angle of rotation can be related to a number of clicks, particularly if feedback is provided at regularly spaced intervals. For example, if feedback is provided every 10 degrees of rotation, then the angle of rotation is the number of clicks multiplied by 10 degrees.

FIGS. 12A-12C are schematic illustrations of various rotational inputs for an example Control knob 800, evaluated in terms of angle of rotation. The angle of rotation is shown as θ in FIGS. 12A-12C. The angle of rotation θ is the angle formed by rays (or line segments) extending from a center of Control knob 800 through (or to) the starting point or ending point.

Although specific examples of a short turn, medium turn, and long turn are shown in FIGS. 12A, 12B, and 12C, respectively, other turns can be categorized as short turns, medium turns, and long turns, as discussed above. Although Control knob 800 is shown as having feedback positions 802, other embodiments can be implemented without feedback positions 802.

FIG. 11A shows a schematic example of a short turn 844. As shown in FIG. 11A, Control knob 800 has been rotated approximately 27° during short turn 844. Short turn 844 has a starting point 846 and an ending point 848.

FIG. 11B shows a schematic example of a medium turn 854. As shown in FIG. 11B, Control knob 800 has been rotated approximately 55° during medium turn 854. Medium turn 854 has a starting point 856 and an ending point 858.

FIG. 11C shows a schematic example of a long turn 864. As shown in FIG. 11C, Control knob 800 has been rotated approximately 120° during long turn 816. Long turn 816 has a starting point 866 and an ending point 868.

In some embodiments, turn magnitude is evaluated in terms of arc length (which can be thought of distance traveled by the knob's outer edge). Arc length of a turn can be determined by first determining an angle of rotation, examples of which are described above. Then the angle of rotation can be converted to a fraction out of 360 degrees and that fraction multiplied by a known circumference of the knob. As an example, if a turn magnitude has an angle of rotation of 30°, and a radius of the knob is 2.5 cm, then the arc length is $(30/360)*2*\pi*(2.5 \text{ cm})$, or about 1.3 cm.

Referring again to FIG. 9, after determining an amount of the first characteristic (operation 622), a first characteristic output is determined (operation 624). Determining the first characteristic output (operation 624) includes comparing the amount to predefined media playback actions based on a predetermined scale. That is, a turn magnitude can correspond with various media playback actions and operation 624 matches the turn magnitude with one of those media playback actions.

For example, when there are three amounts of a first characteristic, such as short turn, medium turn, and long turn, there are three media playback actions. A short turn corresponds to a first media playback action, a medium turn corresponds to a second media playback action, and a long turn corresponds to a third media playback action.

Figure 12:
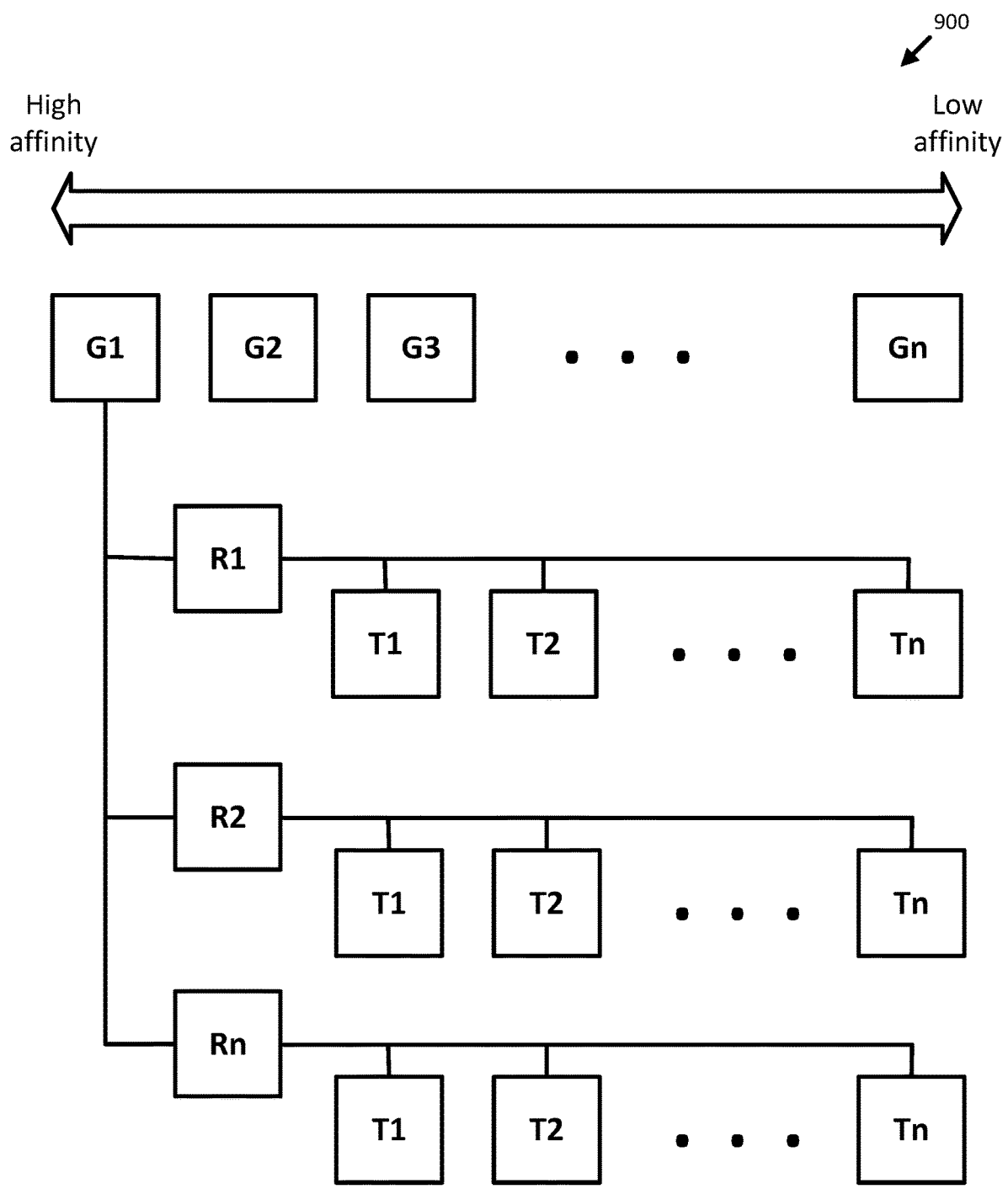
FIG. 12 is a schematic diagram of an example media content hierarchy.

Referring to FIG. 12, a schematic diagram of a media content hierarchy 900 is provided. The example media content hierarchy 900 shows tracks $T_1, T_2, \ldots T_n$ arranged in various radio stations $R_1, R_2, \ldots R_n$ for a given genre $G_1$. Multiple genres $G_1, G_2, G_3, \ldots G_n$ are shown, where $G_1$ is predicted to have a high affinity for a particular user. $G_n$ is predicted to have, relatively, the lowest affinity for the particular user.

A user's affinity to various genres can be determined using a variety of factors, such as age, gender, city, country, and the like. In combination, or separately, a user's affinity to various genres can be determined based on the user's prior listing history. User affinity can be constantly updated based on a user's consumption of media. For example, the more a user listens to a specific genre, the higher the user's affinity to that specific genre.

A plurality of radio stations $R_1, R_2, \ldots R_n$ are categorized as being part of genre $G_1$. Other genres, $G_2, G_3, \ldots G_n$ also include one or more radio stations. Each radio station $R_1, R_2, \ldots R_n$ includes a plurality of tracks $T_1, T_2, \ldots T_n$ arranged in a particular play order. Each radio station $R_1, R_2, \ldots R_n$ in a given genre can include tracks that are included in other radio stations of that genre, and/or radio stations in a different genre.

In one embodiment, media playback begins with a first track that is part of a first radio station that is part of a first genre. That is, each media track can be classified in terms of a genre, a radio station, and a track number in the radio station. For example, a given track $T_m$ that is queued can be represented schematically as $G_1\text{-}R_1\text{-}T_m$. A first media playback action can be to skip a track. So if the first characteristic output is determined to be a short turn, which corresponds to skipping a track, then the next track in the same radio and same genre would be queued, represented as $G_1\text{-}R_1\text{-}T_{m+1}$. In other words, the first characteristic output determined (operation 624) is to skip to the next track in the same radio and genre.

A second media playback action can be to change a radio station within the same genre. If the first characteristic output is determined to be a medium turn, which corresponds to changing a radio station, then the first track in another radio station is queued. For example, if a current track playing is classified in genre, radio, and track number as $G_1\text{-}R_m\text{-}T_m$, then the next track queued would be represented as $G_1\text{-}R_{m+1}\text{-}T_1$.

A third media playback action can be to change a genre. If the first characteristic is determined to be a long turn, which corresponds to changing the genre, then the first track in a different radio station of a different genre is queued. For example, if a current track playing is classified in genre, radio, and track number as $G_m\text{-}R_m\text{-}T_m$, then the next track queued would be represented as $G_{m+1}\text{-}R_1\text{-}T_1$.

Referring again to FIG. 9, after determining the first characteristic output (operation 624), a second characteristic output is determined (operation 626). Determining the second characteristic (operation 626) includes determining a direction that the knob was turned. The second characteristic includes an indication of whether the knob was turned clockwise or counterclockwise.

Referring again to FIG. 7, after analyzing rotational input (operation 620), media playback action is determined (operation 660). Determining media playback action (operation 660) includes analyzing the first characteristic output to determine the user intent. For example, whether the user indicated with the knob turn an intent to skip a track, a radio station, or a genre. Determining media playback action (operation 660) also includes analyzing the second characteristic to determine whether to advance or reverse the action indicated by the first characteristic.

As examples, when a turn is clockwise, then the media playback action includes progressing to the next item. A short turn clockwise advances playback to the next track in the same radio station and genre as the track currently playing. A medium turn clockwise advances playback to the first track in a new station, but keeping the genre the same. Typically, the next radio station queued is determined by the next highest affinity radio station. A long turn clockwise advances playback to the first track in a first radio station in a different genre. Typically, the next genre is determined by the genre having the next highest affinity to the user.

When a turn is counterclockwise, then the media playback action reverses, or "undoes" the previous action. For example, a short turn in the counterclockwise direction would go back to the previous track. As another example, a medium turn in the counterclockwise direction would go back to the previous radio station. As another example, a long turn in the counterclockwise direction would go back to the previous genre.

After determining media playback action (operation 660), optionally, voice assistant action is determined (operation 698). Determining voice assistant action (operation 698) can include determining whether to provide audible feedback to the user regarding the media playback action. Example audible feedback includes announcing the action, such as "playing new track," "playing new radio station," or "playing new genre". Audible feedback can also include announcing the name of the track, radio station, and/or genre. In some instances, user preferences associated with a user account can indicate how much information the user would like to hear after a knob rotation.

FIG. 13 is a front perspective view of an example embodiment of the PMSA 500 internal structure. As shown, PMSA 500 includes body 1001 supporting the control knob assembly 510. In some embodiments, the control knob assembly 510 includes the rotational input sensor device 890 that detects receipt of the rotational input on the rotary knob 1020. In some embodiments, the rotational input sensor device 890 includes an optical rotary encoder assembly 1000. Control knob assembly 510 can include one or more components in addition to the components shown in FIG. 13.

In some embodiments, the optical rotary encoder assembly 1000 includes a disc or wheel that is made of glass or plastic with alternating transparent and opaque areas or alternating light and dark strips around a periphery of the disc or wheel. The optical rotary encoder assembly 1000 can further include a light source and photo detector array configured to read the optical pattern that results from the disc's position at any one time. In some embodiments, a reflected binary code (RBC) can be used. Such a code can be read by a controlling device, such as a microprocessor or microcontroller to determine the angle of the disc or wheel. In some embodiments, the optical rotary encoder assembly 1000 is configured to detect an absolute position of the rotary knob 1020. In other embodiments, the optical rotary encoder assembly 1000 is configured to detect a relative position of the rotary knob 1020.

In the illustrated example, the optical rotary encoder assembly 1000 includes a sensing wheel 1002 and one or more sensing units, such as a first sensing unit 1004 and a second sensing unit 1006.

The sensing wheel 1002 is configured to rotate with the rotary knob 1020. The sensing wheel 1002 has a plurality of first strips 1010 and a plurality of second strips 1012 that are alternately arranged at a peripheral area of the sensing wheel 1002 (e.g., the peripheral strip area). The first strips 1010 can have a first reflection coefficient, and the second strips 1012 can have a second reflection coefficient different from the first reflection coefficient. By way of example, the first strips 1010 has a dark color (e.g., black), and the second strips 1012 has a light color (e.g., white).

The sensing units 1004 and 1006 are arranged adjacent the sensing wheel 1002 and configured to detect the rotation and/or position of the sensing wheel 1002. In some embodiments, the sensing units 1004 and 1006 are arranged above the peripheral area of the sensing wheel 1002 where the first strips 1010 and the second strips 1012 are located. The sensing units 1004 and 1006 are fixedly arranged while the sensing wheel 1002 rotates according to the rotation of the rotary knob 1020. In some embodiments, the sensing units 1004 and 1006 are secured to the opposite rear surface 958 of the head plate 954 of the carrier support frame 950.

The sensing units 1004 and 1006 are configured to emit light toward the peripheral strip area and receive any reflected light from the peripheral strip area of the sensing wheel 1002. In some embodiments, each of the sensing units 1004 and 1006 includes a light emitting element and a light receiving element (e.g., a photo detector). As the sensing wheel 1002 rotates, the light beam emitted from the sensing units 1004 and 1006 can reflect from the first strips 1010 or the second strips 1012. The light reflected from the first strips 1010 have different reflection from the light reflected from the second strips 1012 due to different reflection coefficients. Therefore, the light reflected from the first strips 1010 generate a first signal, and the light reflected from the second strips 1012 generates a second signal that is different from the first signal.

In some embodiments, the sensing units 1004 and 1006 can process the first signal and the second signal and convert them into a pulse wave that is suitable for interfacing the processing device of the PMSA 500. By way of example, when the first strip 1010 (e.g., black strip) is in front of the sensing unit 1004, 1006, the output voltage switches to a high voltage (e.g., 5 VDC). When the seconds strip 1012 (e.g., white strip) is in front of the sensing unit 1004, 1006, the output voltage switches to a low voltage (e.g., 0 VDC). The processing device of the PMSA 500 can read these pulses count them. Based on the number of pulses that are detected per wheel revolution, the amount of rotation of the sensing wheel 1002 can be calculated. Thus, the amount of rotation of the rotary knob 1020 is also determined because the sensing wheel 1002 is configured to rotate together with the rotary knob 1020. In addition or alternatively, the speed of rotation of the sensing wheel 1002 (and thus the speed of rotation of the rotary knob 1020) can be also calculated by considering the period of time over which the sensing wheel 1002 rotates.

In some embodiments, the first sensing unit 1004 and the second sensing unit 1006 are used for a quadrature encoder to detect the direction of rotation of the sensing wheel 1002. The first sensing unit 1004 and the second sensing unit 1006 can be arranged to be pointed at different strips (i.e., either the first strip 1010 or the second strip 1012). By way of example, the first sensing unit 1004 is pointed at the first strip 1010 (e.g., the start thereof) and the second sensing unit 1006 is pointed at the second strip 1012 (e.g., the center thereof). In some embodiments, the first sensing unit 1004 and the second sensing unit 1006 can be located around the sensing wheel 1002 such that they have an offset of one half the width of the first or second strip. Such an offset can provide a phase difference (e.g., lead or lag) of a phase detected from the first sensing unit 1004 and a phase detected from the second sensing unit 1006, and the phase different can be used to detect the direction of rotation of the sensing wheel 1002.

In other embodiments, the rotational input sensor device 890 can be of other types, such as mechanical encoders, magnetic encoders, capacitive encoders, or other devices that can convert the angular position or motion to an analog or digital signal.

Where user data is used, it can be handled according to a defined user privacy policy and can be used to the extent allowed by the user. Where the data of other users is used, it can be handled in an anonymized matter so the user does not learn of the details of other users generally or specifically.

The various examples and teachings described above are provided by way of illustration only and should not be construed to limit the scope of the present disclosure. Those skilled in the art will readily recognize various modifications and changes that may be made without following the examples and applications illustrated and described herein, and without departing from the true spirit and scope of the present disclosure.

What is claimed is:

1. A method for queuing media content for playback, the method comprising:
 queuing a first media context, the first media context including media content items;
 receiving a rotational input;
 analyzing the rotational input to determine an amount of rotation and a direction of the rotation; and determining a playback action based on the amount of rotation and the direction of the rotation, wherein the playback action includes progressing to a next playback action based on the direction of the rotation, and wherein progressing to the next playback action includes advancing to a next media content item of the first media context or queuing a second media context based on the amount of rotation.

2. The method of claim 1, wherein analyzing the rotational input to determine the amount of rotation includes determining a rotational arc length.

3. The method of claim 1, wherein analyzing the rotational input to determine the amount of rotation includes analyzing a rotational angle, the rotational angle being defined as an angle between a starting position and an ending position of the rotational input.

4. The method of claim 1, wherein analyzing the rotational input to determine the amount of rotation includes analyzing a number of feedback positions passed during the rotational input.

5. The method of claim 1, wherein analyzing the rotational input to determine the amount of rotation includes classifying the amount of rotation as a short turn, a medium turn, or a long turn.

6. The method of claim 1, wherein the playback action further includes reversing to a previous playback action based on the direction of the rotation, and depending on the amount of rotation, retrieving a previous media content item of the first media context, or retrieving a previous media context.

7. The method of claim 1, wherein the media content items in the first media context are selected based on a listening history of a user.

8. A media content playback system, comprising:
one or more processing devices; and
a memory device coupled to the one or more processing devices and including instructions thereon that, when executed by the one or more processing devices, cause the one or more processing devices to:
queue a media context, the media context including media content items;
receive a rotational input;
analyze the rotational input to determine an amount of rotation and a direction of the rotation; and
determine a playback action based on the amount of rotation and the direction of the rotation, wherein the playback action includes progressing to a next playback action based on the direction of the rotation, and wherein progressing to the next playback action includes advancing to a next media content item of the media context or queuing another media context based on the amount of rotation.

9. The media content playback system of claim 8, further comprising a rotatable control knob, and wherein the rotational input is received from the rotatable control knob.

10. The media content playback system of claim 9, wherein the rotatable control knob is included in a media playback device which does not include a display device.

11. The media content playback system of claim 8, wherein the playback action further includes reversing to a previous playback action based on the direction of the rotation, and depending on the amount of rotation, retrieving a previous media content item of the first media context, or retrieving a previous media context.

12. At least one non-transitory computer-readable storage device storing data instructions that, when executed by at least one computing device, cause the at least one computing device to:
queue a media context, the media context including media content items;
receive a rotational input;
analyze the rotational input to determine an amount of rotation and a direction of the rotation; and
determine a playback action based on the amount of rotation and the direction of the rotation, wherein the playback action includes progressing to a next playback action based on the direction of the rotation, and wherein progressing to the next playback action includes advancing to a next media content item of the media context or queuing another media context based on the amount of rotation.

13. The at least one non-transitory computer readable storage device of claim 12, wherein the playback action further includes reversing to a previous playback action based on the direction of the rotation, and depending on the amount of rotation, retrieving a previous media content item of the first media context, or retrieving a previous media context.

14. The at least one non-transitory computer readable storage device of claim 12, wherein analyzing the rotational input to determine the amount of rotation includes classifying the amount of rotation as a short turn, a medium turn, or a long turn.

* * * * *